US012695711B1

(12) United States Patent
Carroll et al.

(10) Patent No.: US 12,695,711 B1
(45) Date of Patent: Jul. 28, 2026

(54) SYSTEMS AND METHODS FOR CONTEXTUALIZED RESOURCE ORCHESTRATION IN DISTRIBUTED NETWORKS

(71) Applicant: ClinNEXUS Inc., Los Angeles, CA (US)

(72) Inventors: Gregory Shawn Carroll, Los Angeles, CA (US); Peter Andrew Crosby, Aliso Viejo, CA (US); Kevin Michael Fickenscher, Kittery, ME (US)

(73) Assignee: ClinNEXUS Inc.

( * ) Notice: Subject to any disclaimer, the term of this patent is extended or adjusted under 35 U.S.C. 154(b) by 0 days.

(21) Appl. No.: 19/322,542

(22) Filed: Sep. 8, 2025

Related U.S. Application Data

(63) Continuation-in-part of application No. 18/892,119, filed on Sep. 20, 2024, now abandoned.

(60) Provisional application No. 63/552,160, filed on Feb. 11, 2024.

(51) Int. Cl.
*H04L 47/70* (2022.01)

(52) U.S. Cl.
CPC .......... *H04L 47/822* (2013.01); *H04L 47/821* (2013.01); *H04L 47/826* (2013.01)

(58) Field of Classification Search
None
See application file for complete search history.

(56) References Cited

U.S. PATENT DOCUMENTS

| | | | | |
|---|---|---|---|---|
| 8,332,251 B1 * | 12/2012 | Morris | .................. | G06Q 10/06 |
| | | | | 705/7.22 |
| 8,484,048 B2 * | 7/2013 | Halsted | ................. | G16H 40/63 |
| | | | | 705/3 |
| 10,325,070 B2 * | 6/2019 | Beale | .................... | G16H 30/20 |

(Continued)

FOREIGN PATENT DOCUMENTS

| | | | | | |
|---|---|---|---|---|---|
| WO | WO-2004059540 A1 * | 7/2004 | .......... | G06Q 10/109 |
| WO | WO-2013098748 A2 * | 7/2013 | ............. | G16H 50/30 |
| WO | WO-2019177620 A1 * | 9/2019 | ............. | G06Q 10/04 |

OTHER PUBLICATIONS

Baldino, Michael et al. "Impact of a Novel Post-Discharge Transitions of Care Client on Hospital Readmissions", Journal of the National Medical Association, Apr. 2021; 113(2):133-141.

(Continued)

*Primary Examiner* — Sandarva Khanal
(74) *Attorney, Agent, or Firm* — Foley & Lardner LLP

(57) ABSTRACT

A system can receive context data corresponding with an end node and resource data corresponding to a plurality of network-accessible resources. The system can apply the context data and the resource data as input to a prioritization model to cause the prioritization model to generate resource priority data for the end node. The system can determine at least one network-accessible resource from the plurality of network-accessible resources for orchestration at the end node based on the resource priority data. The system can generate a resource orchestration plan identifying at least one assignment and sequence of the at least one network-accessible resource for the end node. The system can transmit the resource orchestration plan to an orchestration server for execution and receive outcome data corresponding to execution of the resource orchestration plan at the end node.

16 Claims, 9 Drawing Sheets

(56) References Cited

U.S. PATENT DOCUMENTS

| | | | | |
|---|---|---|---|---|
| 10,665,334 | B2 * | 5/2020 | Baniameri | G16H 40/20 |
| 10,943,676 | B2 * | 3/2021 | Farooq | G16H 50/70 |
| 10,957,451 | B2 | 3/2021 | T et al. | |
| 11,409,561 | B2 * | 8/2022 | Vatidis | G06F 9/5011 |
| 11,551,792 | B2 * | 1/2023 | Stadler | G16H 40/20 |
| 11,985,075 | B1 * | 5/2024 | Manoukian | H04L 47/827 |
| 12,080,428 | B1 * | 9/2024 | Syed | G16H 10/60 |
| 12,205,452 | B2 * | 1/2025 | Neubauer | A61B 5/0205 |
| 2005/0182660 | A1 | 8/2005 | Henley | |
| 2007/0143764 | A1 * | 6/2007 | Kern | G06Q 10/06 |
| | | | | 718/104 |
| 2007/0192132 | A1 * | 8/2007 | Thesman | G16H 10/60 |
| | | | | 705/2 |
| 2009/0182575 | A1 * | 7/2009 | Warner | G06Q 10/06312 |
| | | | | 705/2 |
| 2010/0070294 | A1 * | 3/2010 | Horne | G16H 40/63 |
| | | | | 705/2 |
| 2010/0312581 | A1 * | 12/2010 | Wachtell | G16H 40/20 |
| | | | | 707/812 |
| 2011/0202361 | A1 | 8/2011 | Firminger et al. | |
| 2011/0313784 | A1 | 12/2011 | Harvey et al. | |
| 2013/0268290 | A1 | 10/2013 | Jackson et al. | |
| 2013/0290005 | A1 | 10/2013 | Vesto et al. | |
| 2014/0108024 | A1 * | 4/2014 | Evans | G16H 20/00 |
| | | | | 705/2 |
| 2014/0350967 | A1 * | 11/2014 | Geleijnse | G16H 50/30 |
| | | | | 705/3 |
| 2015/0134388 | A1 * | 5/2015 | Yoo | G06Q 10/063112 |
| | | | | 705/7.14 |
| 2015/0213207 | A1 * | 7/2015 | Amarasingham | G16H 50/50 |
| | | | | 705/2 |
| 2016/0042477 | A1 * | 2/2016 | Gardner | G06Q 10/105 |
| | | | | 705/319 |
| 2017/0039344 | A1 * | 2/2017 | Bitran | G16H 50/20 |
| 2017/0220758 | A1 | 8/2017 | Cox et al. | |
| 2017/0293733 | A1 | 10/2017 | Kelly et al. | |
| 2017/0323067 | A1 | 11/2017 | Kharraz Tavakol | |
| 2018/0113982 | A1 * | 4/2018 | Asthana | G06N 5/045 |
| 2020/0126660 | A1 | 4/2020 | Costantino et al. | |
| 2020/0185089 | A1 | 6/2020 | Karam et al. | |
| 2020/0388360 | A1 * | 12/2020 | Caffarel | G06N 3/09 |
| 2020/0411170 | A1 * | 12/2020 | Brown | G06N 20/00 |
| 2021/0043287 | A1 * | 2/2021 | Stadler | G16H 40/20 |
| 2022/0035671 | A1 * | 2/2022 | Vatidis | G06F 9/5011 |
| 2022/0037003 | A1 * | 2/2022 | Oliveira | G06F 8/38 |
| 2022/0138887 | A1 | 5/2022 | Shang et al. | |
| 2022/0374804 | A1 * | 11/2022 | Ramtekkar | G06Q 10/02 |
| 2023/0162847 | A1 * | 5/2023 | Iyengar | G06Q 10/0631 |
| | | | | 705/2 |
| 2024/0080832 | A1 * | 3/2024 | Türkmen | H04W 72/12 |
| 2025/0191738 | A1 * | 6/2025 | Heavin | G16H 80/00 |

OTHER PUBLICATIONS

Beauvais, Bradley, et al. "Is the Hospital Value-Based Purchasing Program Associated with Reduced Hospital Readmissions?", Journal of Multidisciplinary Healthcare, May 2022; 15:1089-1099.

Braveman, Paula et al. "The Social Determinants of Health: Coming of Age", Annual Review of Public Health, 2011; 32:381-398.

Dixit, Rohit R. "Risk Assessment for Hospital Readmissions: Insights from Machine Learning Algorithms", SSRAML SageScience, 2021; 4(2): 1-15.

Finlayson, Kathleen, et al. "Transitional care interventions reduce unplanned hospital readmissions in high-risk older adults", BMC Health Services Research, 2018; 18(956):9 pages.

Garg, Arvin et al. "Addressing Social Determinants of Health: Challenges and Opportunities in a Value-Based Model", Pediatrics, Apr. 2019; 143(4):5 pages.

Herberg, Stephan et al. "Reducing hospital admissions and transfers to long-term inpatient care: A systematic literature review", Health Services Management Research, 2023; 36(1):10-24.

Hill-Briggs, Felicia et al. "Social Determinants of Health and Diabetes: A Scientific Review", Diabetes Care, 2021; 44:258-279.

Huang, Yi nan et al. "Application of machine learning in predicting hospital readmissions: a scoping review of the literature", BMC Medical Research Methodology, 2021; 21(96):14 pages.

Joseph, K. S et al. "Maternal Mortality in the United States: Recent Trends, Current Status, and Future Considerations", Obstetrics & Gynecology, May 2021; 137(5):763-771.

Kash, Bita a et al. "Successful hospital readmission reduction initiatives: Top five strategies to consider implementing today", Journal of Hospital Administration, 2018; 7(6):16-23.

Liu, Wenshuo et al. "Predicting 30-day hospital readmissions using artificial neural networks with medical code embedding", PLoS One, Apr. 2020; 15(4):12 pages.

Rasmussen, Lisa F0nss et al. "Impact of transitional care interventions on hospital readmissions in older medical patients: a systematic review", BMJ Open, Jan. 2021; 11 (1): 13 Pages.

Rogers, Courtney C. et al. "Designing mobile health to align with the social determinants of health", Frontiers in Digital Health, May 2023; 5:6 pages.

US Final Office Action on US Dtd Mar. 14, 2025.

US Non-Final Office Action on US dated Nov. 29, 2024.

Weiss, Audrey J. et al. "Overview of Clinical Conditions With Frequent and Costly Hospital Readmissions by Payer, 2018", Healthcare Cost and Utilization Project, Statistical Brief #278, Jul. 2021: 19 pages.

White-Willliams, Connie et al. "Addressing Social Determinants of Health in the Care of Patients With Heart Failure: A Scientific Statement From the American Heart Association", AHAIASA Journals, Circulation, Jun. 2020; 141 (22):841-863.

Whitman, Amelia et al. "Addressing Social Determinants of Health: Examples of Successful Evidence-Based Strategies and Current Federal Efforts", ASPE Office of Health Policy Report, Apr. 2022: 30 pages.

Zuckerman, Rachel B. et al. "Readmissions, Observation, and the Hospital Readmissions Reduction Program", The New England Journal of Medicine, Feb. 2016; 37 4(16): 1543-1551.

* cited by examiner

500

501
Input Layer

502
Hidden Layer A

503
Hidden Layer B

504
Output Layer

505 Inputs {$In_1$, $In_2$, $In_3$, $In_4$, .... $In_n$}

506 Hidden Layer A Intermediate Outcomes {$HA_1$, $HA_2$, $HA_3$, $HA_4$, .... $HA_n$}

507 Hidden Layer B Intermediate Outcome {$HB_1$, $HB_2$, $HB_3$, $HB_4$, .... $HB_n$}

508 Outputs {$Out_1$, $Out_2$, $Out_3$, .... $Out_n$}

600

| Resource Pool | Availability? | Service Priority | Score |
|---|---|---|---|
| Clinic Visit | 1 | 5 | 5 |
| Telephone Follow Up | 1 | 7 | 7 |
| Transportation | 1 | 2 | 2 |
| Food | 1 | 1 | 1 |
| Social Worker | 0 | 3 | 0 |
| Medication Delivery | 1 | 4 | 4 |
| Daily Reminder | 1 | 8 | 8 |
| Call Relatives | 0 | 5 | 0 |
| Home Visit | 1 | 0 | 0 |
| Translation | 1 | 0 | 0 |
| Employment Assistance | 0 | 3 | 0 |

800

801 — Receive context data and resource data

802 — Apply the context data and the resource data as input to a prioritization model to cause the prioritization model to generate resource priority data 803 — Determine at least one resource for orchestration 804 — Generate a resource orchestration plan 805 — Transmit the resource orchestration plan 806 — Receive outcome data

SYSTEMS AND METHODS FOR CONTEXTUALIZED RESOURCE ORCHESTRATION IN DISTRIBUTED NETWORKS

BACKGROUND

Modeling assignment and sequencing of resources across distributed networks presents technical challenges. Some existing systems apply static resource allocation rules or non-adaptive priority logic and do not incorporate context data unique to each endpoint device, node, or user entity. Approaches relying on fixed assignment parameters, manual scheduling, and/or without integration of operational status and contextual metadata can fail to facilitate dependencies among resources, adapt to node context, and/or resolve ordering between time-sensitive assignments.

SUMMARY

In contrast to conventional systems, implementations of the present disclosure relate to systems and methods for dynamic resource orchestration through automated, data-driven assignment and sequencing of network-accessible resources. Systems and methods in accordance with the present disclosure can receive context data corresponding to at least one endpoint or node in a distributed network and apply machine learning models such as artificial neural networks to generate resource priority rankings for real-time assignment. Implementations can integrate operational status, location, time, and/or usage characteristics of at least one (e.g., each) end node and at least one (e.g., each) resource to generate an orchestration plan specifying assignment and/or sequencing of resources, dynamically updated to current and/or historical context. The end node can be a computing device, a remote sensor, and/or a human in need of resources. Processing circuits of the system can tag and filter resources by availability, apply prioritization models for ranking, and/or transmit a plan for execution by an orchestration server. The system can receive feedback and outcome data for completed assignments, monitor resource delivery, and/or update plans automatically through iterative model updates. As a result, the implementations can address technical limitations of existing systems by providing responsive, context-aware resource allocation that is scalable and/or adaptable to changes in node demand, resource pool composition, and/or operational constraints across a distributed environment.

In some aspects, the techniques described herein relate to a computer-implemented method, includes: receiving, by at least one processor, context data corresponding with an end node and resource data corresponding to a plurality of network-accessible resources; applying, by the at least one processor, the context data and the resource data as input to a prioritization model to cause the prioritization model to generate resource priority data for the end node; determining, by the at least one processor, at least one network-accessible resource from the plurality of network-accessible resources for orchestration at the end node based on the resource priority data; generating, by the at least one processor, a resource orchestration plan identifying at least one assignment and sequence of the at least one network-accessible resource for the end node; transmitting, by the at least one processor, the resource orchestration plan to an orchestration server for execution; and receiving, by the at least one processor, outcome data corresponding to execution of the resource orchestration plan at the end node.

In some aspects, the techniques described herein relate to a computer-implemented method, wherein the prioritization model includes at least one of a neural network, a machine learning model, a rules-based model, or a statistical model.

In some aspects, the techniques described herein relate to a computer-implemented method, further including: updating, by the at least one processor, the prioritization model based on at least a portion of the outcome data.

In some aspects, the techniques described herein relate to a computer-implemented method, wherein the context data includes at least one of location identifier, time interval, usage statistic, resource availability, or operational status of the end node.

In some aspects, the techniques described herein relate to a computer-implemented method, further includes: tagging, by the at least one processor, at least one of the plurality of network-accessible resources with availability metadata including the location identifier and the time interval; wherein the resource data includes a subset of the plurality of network-accessible resources based on the availability metadata.

In some aspects, the techniques described herein relate to a computer-implemented method, further includes: receiving, by the at least one processor, resource availability data corresponding to a geographical availability and a time availability of at least one of the plurality of network-accessible resources; determining, by the at least one processor based on at least one of the location identifier, the time interval, the usage statistic, or the operational status of the end node, and the resource availability data, at least one available network-accessible resource of the plurality of network-accessible resources for the end node; and updating, by the at least one processor, the resource data based on the at least one available network-accessible resource.

In some aspects, the techniques described herein relate to a computer-implemented method, wherein the location identifier and the time interval include current location data for the end node at a first time, the current location data received in real-time from a user device corresponding with the end node.

In some aspects, the techniques described herein relate to a computer-implemented method, wherein the resource orchestration plan includes two or more network-accessible resources for provision to the end node based on at least one dependency or criteria.

In some aspects, the techniques described herein relate to a computer-implemented method, wherein the context data further includes at least one clinical characteristic and at least one social characteristic of the end node, and at least one of the plurality of network-accessible resources correspond to a categorization as a clinical resource or a social resource.

In some aspects, the techniques described herein relate to a computer-implemented method, further including: causing, by the at least one processor based on the categorization of the at least one network-accessible resource, at least one of: a presentation of a notification on a user device of the end node corresponding to the clinical resource or the social resource; an initiation of execution of the clinical resource or the social resource to the end node; or an allocation of the clinical resource or the social resource to the end node; and updating, by the at least one processor, the outcome data corresponding to the end node based on at least one of (i) the presentation of the notification, (ii) the initiation of execution, or (iii) the allocation.

In some aspects, the techniques described herein relate to a computer-implemented method, further including: receiving, by the at least one processor from at least one external service node, external service node data corresponding to at least one of the plurality of network-accessible resources; and updating, by the at least one processor, the resource priority data based on the external service node data.

In some aspects, the techniques described herein relate to a computer-implemented method, further including: transmitting, by the at least one processor to the at least one external service node, a resource allocation request message corresponding to at least one of the plurality of network-accessible resources; receiving, by the at least one processor from the at least one external service node, at least one resource provisioning response message including a bid parameter, the bid parameter corresponding to at least one of an availability, a cost, a capability, or an assignment for a corresponding network-accessible resource; and determining, by the at least one processor, an inclusion of the corresponding network-accessible resource in the resource orchestration plan based at least on the at least one resource provisioning response message.

In some aspects, the techniques described herein relate to a systems, includes: one or more processors to: receive context data corresponding with an end node and resource data corresponding to a plurality of network-accessible resources; apply the context data and the resource data as input to a prioritization model to cause the prioritization model to generate resource priority data for the end node; determine at least one network-accessible resource from the plurality of network-accessible resources for orchestration at the end node based on the resource priority data; generate a resource orchestration plan identifying at least one assignment and sequence of the at least one network-accessible resource for the end node; transmit the resource orchestration plan to an orchestration server for execution; and receive outcome data corresponding to execution of the resource orchestration plan at the end node.

In some aspects, the techniques described herein relate to a system, wherein the prioritization model includes at least one of a neural network, a machine learning model, a rules-based model, or a statistical model.

In some aspects, the techniques described herein relate to a system, wherein the one or more processors are to: update the prioritization model based on at least a portion of the outcome data.

In some aspects, the techniques described herein relate to a system, wherein the context data includes at least one of location identifier, time interval, usage statistic, resource availability or operational status of the end node.

In some aspects, the techniques described herein relate to a system, wherein the one or more processors are to: tag, by the at least one processor, at least one of the plurality of network-accessible resources with availability metadata including the location identifier and the time interval; wherein the resource data includes a subset of the plurality of network-accessible resources based on the availability metadata.

In some aspects, the techniques described herein relate to a system, wherein the one or more processors are to: receive, by the at least one processor, resource availability data corresponding to a geographical availability and a time availability of at least one of the plurality of network-accessible resources; determine, by the at least one processor based on at least one of the location identifier, the time interval, the usage statistic, or the operational status of the end node, and the resource availability data, at least one available network-accessible resource of the plurality of network-accessible resources for the end node; and update, by the at least one processor, the resource data based on the at least one available network-accessible resource.

In some aspects, the techniques described herein relate to a system, wherein the location identifier and the time interval include current location data for the end node at a first time, the current location data received in real-time from a user device corresponding with the end node.

In some aspects, the techniques described herein relate to a non-transitory computer-readable medium storing instructions that, when executed by at least one processor, cause the at least one processor to perform operations including: receive context data corresponding with an end node and resource data corresponding to a plurality of network-accessible resources; apply the context data and the resource data as input to a prioritization model to cause the prioritization model to generate resource priority data for the end node; determine at least one network-accessible resource from the plurality of network-accessible resources for orchestration at the end node based on the resource priority data; generate a resource orchestration plan identifying at least one assignment and sequence of the at least one network-accessible resource for the end node; transmit the resource orchestration plan to an orchestration server for execution; and receive outcome data corresponding to execution of the resource orchestration plan at the end node.

In some aspects, the techniques described herein relate to a computerized data management and processing system configured to interact with a resource management system (RMS) and an orchestration server (OS) to provide data pertaining to transition resource orchestration (TRO) or extended resource orchestration (ERO) of an end node, the system including: at least one computing device in communication with the RMS and the OS, the at least one computing device including: a prioritization system, memory configured to store computer-executable instructions; and at least one processor configured to access the memory and execute the computer-executable instructions to: receive resource data including a resource pool indicative of one or more resources associated with the RMS, the one or more resources including resource location and resource time data; receive, from the RMS, end node data including one or more end node characteristics associated with the end node and historical data associated with an end node population including at least the end node, the one or more end node characteristics including location and time data; cause the prioritization system to generate, based on the resource data and the end node data, resource priority data including one or more resource priorities corresponding to the one or more resources and associated with the end node; determine, based on the resource data, the end node data, and the resource priority data, at least one recommended resource of the one or more resources to provide to the end node, the at least one recommended resource associated with the TRO or the ERO of the end node; generate, based on the resource data, the end node data, the resource priority data, and the determination of the at least one recommended resource, recommended and sequenced resource data including a recommended resource sequence for providing the at least one recommended resource to the end node; transmit the recommended and sequenced resource data to the OS; receive end node outcome data indicative of one or more end node outcomes associated with provision or attempted provision of the at least one recommended resource to the end node; cause the prioritization system to modify, based on the recommended and sequenced resource data and the end node outcome data, the end node data and the resource priority data; predict, based on the end node data, a change in risk of remote site admission after provision of the at least one recommended resource to the end node; and automatically modify, based on the prediction of the change in risk of remote site admission, the recommended and sequenced resource, wherein the prioritization system includes an artificial neural network (ANN), the ANN including an input layer, a hidden layer, and an output layer, the ANN trained using curated medical records in order to provide real-time error checking of end node data.

In some aspects, the techniques described herein relate to a system, wherein the location and time data is indicative of the permanent location or the current location of the end node during at least a first time.

In some aspects, the techniques described herein relate to a system, wherein the at least one processor is further configured to access the memory and execute the computer-executable instructions to: receive resource availability data indicative of a geographical availability and a time availability of the one or more resources; determine, based on the location and time data and the resource availability data, one or more available resources of the one or more resources to provide to the end node; and modify, based on the determination of the one or more available resources, the resource data.

In some aspects, the techniques described herein relate to a system, wherein the location and time data is indicative of the current location of the end node at the first time, the current location transmitted in substantially real-time by a mobile device (e.g., a mobile phone) associated with the end node.

In some aspects, the techniques described herein relate to a system, wherein the OS is associated with a care coordinator, the at least one processor further configured to access the memory and execute the computer-executable instructions to: receive, from the care coordinator, override or re-order instructions associated with the one or more resource priorities; and modify, based on the override or re-order instructions, the resource priority data.

In some aspects, the techniques described herein relate to a system, wherein the one or more end node characteristics include at least one clinical characteristic and at least one social characteristic of the end node, and each of the one or more resources is categorized as a clinical resource or a social resource in the resource pool.

In some aspects, the techniques described herein relate to a system, wherein at least one of the one or more resources includes an automated communication between the OS and the end node.

In some aspects, the techniques described herein relate to a system, wherein the automated communication is automatically transmitted by a smart device in communication with the at least one computing device and configured to provide a clinical resource or a social resource to the end node, the clinical resource or the social resource including transmission of the automated communication, the at least one processor further configured to access the memory and execute the computer-executable instructions to: modify, based on the provision of the clinical resource or the social resource by the smart device, the end node outcome data.

In some aspects, the techniques described herein relate to a system, wherein the at least one computing device is further in communication with one or more external care or resource service nodes, the at least one processor further configured to access the memory and execute the computer-executable instructions to: receive external service node data from the one or more external care or resource service nodes; and modify, based on the external service node data, the resource priority data.

In some aspects, the techniques described herein relate to a system, wherein the at least one processor is further configured to access the memory and execute the computer-executable instructions to: automatically invite at least a portion of the one or more external care or resource service nodes to bid to provide at least one of the one or more resources; receive one or more bids to provide at least one of the one or more resources from at least the portion of the one or more external care or resource service nodes; and automatically accept or reject the one or more bids.

In some aspects, the techniques described herein relate to a system, wherein the at least one computing device is in communication with at least one of the HCP or the OS via a cloud platform, and at least one of generating the resource priority data, generating the recommended and sequenced resource data, or modifying the end node data and the resource priority data is automatically performed in substantially real-time via the cloud platform.

In some aspects, the techniques described herein relate to a system, wherein the ANN further includes a second hidden layer.

In some aspects, the techniques described herein relate to a system, wherein the ANN uses an uplift modeling technique.

In some aspects, the techniques described herein relate to a method of computerized data management and processing of data associated with a resource management system (RMS) and an orchestration server (OS) to provide data pertaining to transition resource orchestration (TRO) or extended resource orchestration (ERO) of an end node, the method including: receiving, by at least one computing device in communication with the RMS and the OS, resource data including a resource pool indicative of one or more resources associated with the RMS, the one or more resources including resource location and resource time data, and the at least one computing device including a prioritization system; receiving, by the at least one computing device, from the RMS, end node data including one or more end node characteristics associated with the end node and historical data associated with an end node population including at least the end node, the one or more end node characteristics including location and time data; generating, by the prioritization system, based on the resource data and the end node data, resource priority data including one or more resource priorities corresponding to the one or more resources and associated with the end node; determining, by the at least one computing device, based on the resource data, the end node data, and the resource priority data, at least one recommended resource of the one or more resources to provide to the end node, the at least one recommended resource associated with the TRO or the ERO of the end node; generating, by the at least one computing device, based on the resource data, the end node data, the resource priority data, and the determination of the at least one recommended resource, recommended and sequenced resource data including a recommended resource sequence for providing the at least one recommended resource to the end node; transmitting, by the at least one computing device, the recommended and sequenced resource data to the OS; receiving, by the at least one computing device, end node outcome data indicative of one or more end node outcomes associated with provision or attempted provision of the at least one recommended resource to the end node; modifying, by the prioritization system, based on the recommended and sequenced resource data and the end node outcome data, the end node data and the resource priority data, predicting, by the at least one computing device, based on the end node data, a change in risk of remote site admission after provision of the at least one recommended resource to the end node; and automatically modifying, by the at least one computing device, based on the prediction of the change in risk of remote site admission, the recommended and sequenced resource data, wherein the prioritization system includes an artificial neural network (ANN), the ANN including an input layer, a hidden layer, and an output layer, the ANN trained using curated medical records in order to provide real-time error checking of end node data, and wherein the at least one computing device is in communication with at least one of the HCP or the OS via a cloud platform, and at least one of generating the resource priority data, generating the recommended and sequenced resource data, or modifying the end node data and the resource priority data is automatically performed in substantially real-time by the at least one computing device via the cloud platform.

In some aspects, the techniques described herein relate to a method, wherein the location and time data is indicative of the current location of the end node, the method further including: transmitting, by a mobile device associated with the end node, in substantially real-time, the current location of the end node; receiving, by the at least one computing device, resource availability data indicative of a geographical availability and a time availability of the one or more resources; determining, by the at least one computing device, based on the location and time data and the resource availability data, one or more available resources of the one or more resources to provide to the end node; and modifying, by the at least one computing device, based on the determination of the one or more available resources, the resource data.

In some aspects, the techniques described herein relate to a method, wherein the one or more end node characteristics include at least one clinical characteristic and at least one social characteristic of the end node, and each of the one or more resources is categorized as a clinical resource or a social resource in the resource pool.

In some aspects, the techniques described herein relate to a method, wherein at least one of the one or more resources includes an automated communication between the OS and the end node, the method further including: automatically transmitting, by a smart device in communication with the at least one computing device and configured to provide a clinical resource or a social resource to the end node, the automated communication; providing, by the smart device, the clinical resource or the social resource to the end node, wherein the clinical resource or the social resource includes transmission of the automated communication by the smart device; and modifying, by the at least one computing device, based on the provision of the clinical resource or the social resource by the smart device, the end node outcome data.

In some aspects, the techniques described herein relate to a method, wherein the OS is associated with a care coordinator and the at least one computing device is further in communication with one or more external care or resource service nodes, the method further including: receiving, by the at least one computing device, from the one or more external care or resource service nodes, external service node data; modifying, by the at least one computing device, based on the external service node data, the resource priority data; automatically inviting, by the at least one computing device, at least a portion of the one or more external care or resource service nodes to bid to provide at least one of the one or more resources; receiving, by the at least one computing device, from at least the portion of the one or more external care or resource service nodes, one or more bids to provide at least one of the one or more resources; automatically accepting or rejecting, by the at least one computing device, the one or more bids; receiving, by the at least one computing device, from the care coordinator, override or re-order instructions associated with the one or more resource priorities; and modifying, by the at least one computing device, based on the override or re-order instructions, the resource priority data.

In some aspects, the techniques described herein relate to a method, wherein the ANN further includes a second hidden layer.

In some aspects, the techniques described herein relate to a system, wherein at least one of receiving the resource data, receiving the end node data, or receiving the end node outcome data is automatically performed in substantially real-time via the cloud platform.

BRIEF DESCRIPTION OF THE DRAWINGS

The present systems and methods for systems and methods for contextualized resource orchestration in distributed networks are described in detail below with reference to the attached drawing FIGS., wherein.

DETAILED DESCRIPTION

Figure 1A:
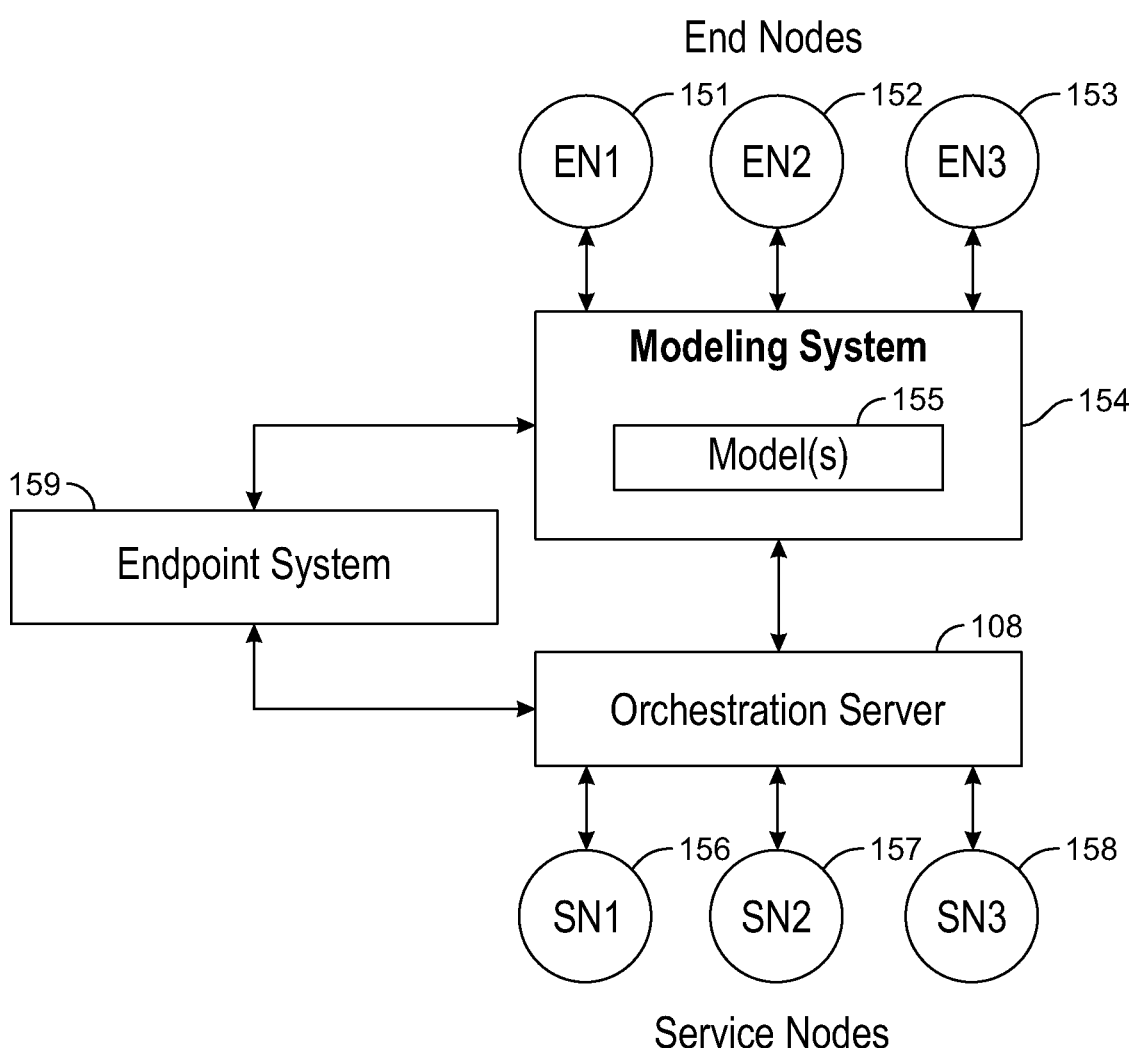
FIG. 1A illustrates an example system.

This disclosure relates to systems and methods for resource orchestration in distributed network environments using context-driven prioritization. Resource orchestration platforms operating in dynamic, multi-resource environments (e.g., cloud infrastructure networks, enterprise multi-site deployments, and/or mobile edge networks) can include various processing circuits, context data collectors, and/or orchestration servers (e.g., coordination nodes, assignment processors, and/or any distributed computing devices) to allocate and schedule resources for endpoint devices. Traditional methods for assigning network-accessible resources often rely on static assignment tables, manually set priorities, and/or basic round-robin approaches. For example, a conventional implementation can apply a fixed sequence to assign resources to endpoints, disregarding dynamically changing node context, resource availability, and/or priority scores. Such approaches cannot dynamically adjust the assignment and/or sequencing in response to context, nor process and/or update prioritization based on outcome data of completed assignments. Other methods segment the resource pool based on fixed criteria, which can result in resource bottlenecks and/or underutilization of available resources. Additionally, systems that manually rank resources based on periodic reports can be slow to react to rapid changes in network topology, resulting in assignment delays, increased processing load, and/or lost opportunities for real-time (or near real-time) optimization.

Systems and methods in accordance with the present disclosure can generate a resource orchestration plan by applying context data associated with an end node (e.g., operational status, current location, time interval, resource availability, usage statistic, and/or any context feature) and resource data associated with a plurality of network-accessible resources (e.g., availability metadata, resource class, capacity, and/or assignment constraints) as input to a prioritization model (e.g., neural network, machine-learned scoring rule, and/or any adaptive ranking engine). The prioritization model can generate resource priority data for at least one (e.g., each) network-accessible resource. That is, the model can assign a ranking, score, or prioritization value (e.g., between 0 and 1, rank 1 through N, categorical assignment, and/or any assignment indicator), supporting context-based selection. The system can determine at least one network-accessible resource from the plurality of network-accessible resources for orchestration at the end node based on the resource priority data, and can generate a resource orchestration plan identifying at least one assignment and sequence (e.g., ordered list, dependency chain, and/or time slot assignment) of the at least one network-accessible resource for the end node. The plan can be transmitted to an orchestration server (e.g., distributed agent, central coordinator, and/or any executing processor) for execution. Additionally, outcome data (e.g., delivery confirmation, completion timestamp, error code, and/or any execution metric) can be received and/or processed corresponding to execution of the resource orchestration plan at the end node. Accordingly, the disclosed systems and methods can provide technical improvements over static or manually-updated scheduling by facilitating context-sensitive, adaptive planning and execution across distributed network resources.

In some implementations, disclosed systems and methods can update the prioritization model and/or assignment logic based on analysis of outcome data (e.g., observed success rates, failure metrics, throughput, and/or utilization statistics) to update subsequent prioritization and resource orchestration plans for future end node assignments. For example, updated context and/or outcome data can be incorporated as additional input features to the prioritization model, allowing the system to improve assignment accuracy, increase response time, and/or support self-correction in environments with incomplete or sparse data. The resource orchestration plan can integrate dependencies and/or criteria (e.g., required preconditions, minimum service levels, regional assignments, and/or cost constraints) for at least one (e.g., each) end node and can dynamically revise resource assignment or sequence based on feedback received. By generating assignment plans that are responsive to current operational and network context (e.g., by applying outcome-tracking to further refine subsequent allocations) implementations described herein can improve technical operation, reduce delays, and/or support network-wide orchestration for distributed resources (e.g., cloud resources, edge devices, mobile infrastructure, and/or any networked endpoint domain) compared with traditional static assignment or manual scheduling systems.

Additionally, systems and methods in accordance with the present disclosure can determine (e.g., generate an ordered resource sequence by applying dependency resolution, schedule resources for concurrent or sequential execution, and/or allocate assignment slots based at least on real-time resource and end node status) at least one resource orchestration plan (e.g., ordered assignment of compute resource, bandwidth, storage segment, edge service, and/or any network-accessible resource) for at least one end node based at least on current and historical context data and at least one operational parameter (e.g., resource availability window, assignment cost, regional access policy, usage quota, precedence constraint, or any infrastructure-defined criterion) of the end node and/or resource, the at least one operational parameter corresponding with a subset of the plurality of available resources. The resource orchestration plan can be a data structure identifying a temporal and/or logical sequence of network-accessible resource allocations for an end node. That is, the resource orchestration plan can include a set of allocation indices and/or resource identifiers for at least one (e.g., each) assignment event or slot along the workflow, representing the optimized and/or otherwise constraint-satisfying resource schedule for the end node across the resource pool. Accordingly, the systems and methods can also provide technical improvements (e.g., reducing processing requirements for assignment generation from $O(mn)$ to $O(kn)$, reducing the frequency of allocation conflict checks from $O(mn)$ to $O(k)$, where n is the number of available resources, m is the number of end nodes, and k is the average number of candidate matches per node, and allowing dynamic reassignment based on streaming outcome feedback in $O(1)$ or $O(k)$ time per reassignment operation) to constraint-aware resource orchestration for distributed network systems.

The technical improvements can provide efficient scaling to large numbers of end nodes and/or resources in distributed environments. For example, the system can use parallelized instruction execution and memory management to process multiple assignment and reassignment operations simultaneously across network-connected devices. The technical improvements in processing and memory efficiency can allow system 150 to operate within constrained computational resources and/or to support real-time (or near real-time) response in environments where assignment requests are frequent and unpredictable. The reduced conflict checking and prioritization complexity can result in lower latency, decreased data transfer requirements, and/or more consistent update rates, even as the number of managed end nodes and/or available resources increases. In some implementations, the technical improvements can also provide continuous and/or near-continuous adjustment to assignment plans in response to updated feedback, context changes, and/or external input, improving adaptability and utilization across the network.

The systems and methods in accordance with the present disclosure can apply a trained prioritization model (e.g., a neural network with multiple layers, a context-aware ranking engine, and/or an assignment prediction module) which is configured to process multidimensional context data and resource data that are formatted as high-dimensional feature vectors and/or metadata arrays. The model can generate resource priority data and can sequence network-accessible resources based on operational parameters, historic outcome values, and/or real-time (near real-time) resource metadata. Processing circuits can compute assignment plans using numerical operations such as weighted matrix transformations and multi-step aggregation routines using data structures resident in electronic memory. The prioritization model can use patterns learned from large, curated datasets that reflect domain-specific operational logic and resource network dependencies, where the input data structure and model architecture can be distinct from those of general-purpose language or decision models. Accordingly, the described systems and methods provide technical improvements such as improved generation of resource orchestration plans for numerous resources and endpoints, adaptive updating of prioritization in response to dynamic status signals, and/or integration of feedback information.

The technical implementation can result in O(mn) memory use and increased runtime as the number of end nodes m and the number of available resources n increases. The staged prioritization approach of the present disclosure can reduce the search space for assignment by first processing a context-featured representation, such as an m-by-n matrix in which at least one (e.g., each) entry stores a computed or aggregated priority value for the corresponding combination of end node and network-accessible resource (e.g., using feature weighting, historical aggregation, and/or model scoring). The system 100 can generate an initial resource selection for at least one (e.g., each) end node by applying a prioritization operation along the context matrix, producing a set of candidate resource assignments without construction of a full allocation grid. The orchestration plan can then be generated by applying a sequencing and scheduling operation to determine assignment order or timing for at least one (e.g., each) candidate, reducing computational complexity from a full search over all possible assignments to a combination of prioritized filtering and constrained sequencing. As a result, the described approach can reduce node-side memory footprint from $O(mn^2)$ to $O(mn+km)$ (where k can be the number of assignments in a plan per end node), decrease storage required for resource-context data structures, and minimize and/or reduce the total number of assignment and conflict-check computations relative to exhaustive assignment methods. The disclosed architecture supports use in real-time, embedded, and/or large-scale network resource orchestration under strict hardware and compute limitations.

With reference to FIG. 1A, FIG. 1A shows an example block diagram of system 150, in accordance with some implementations of the present disclosure. This and other arrangements described herein are provided as examples. Other arrangements and elements (e.g., machines, interfaces, functions, orders, and/or groupings of functions) can be used in addition to or instead of those shown, and/or some elements can be omitted. Many of the elements described are functional entities that can be implemented as discrete components, distributed components, and/or combined in any suitable configuration. Functions described as being performed by entities and/or systems can be carried out by hardware, firmware, and/or software, such as one or more processing circuits executing instructions stored in one or more memory circuits. In some implementations, the system and methods described herein can be implemented using one or more artificial intelligence (AI) models (e.g., trained to generate resource priority rankings for network-accessible resources based at least on context data of an end node), one or more computing devices, and/or one or more data centers or components thereof.

System 150 can include, among other elements, at least one processing circuit configured to execute instructions, at least one memory circuit configured to store data and instructions, one or more input and/or output interfaces, one or more network interfaces for communication with other systems and/or devices, one or more data storage devices, and/or one or more communication buses operably connecting these components. The processing circuit can include one or more central processing units (CPU), microcontrollers, digital signal processors, and/or other suitable processors. The memory circuit can include volatile memory, non-volatile memory, and/or any combination thereof. The network interface can include wired and/or wireless interfaces. Components of system 150 can be implemented in a single device or distributed across multiple devices, and/or can communicate using a network that can include a local area network (LAN), a wide area network (WAN), the Internet, a cellular network, and/or any combination thereof. The components can communicate over such a network using any suitable communication protocols. In some implementations, the system 150 can include, for example, one or more processors, memory circuits, communication interfaces, computer-readable media, input and/or output subsystems, and any combination of such hardware elements.

The system 150 can implement at least a portion of an orchestration pipeline, such as but not limited to a data ingestion pipeline, a context-aware prioritization pipeline, and/or a network resource allocation pipeline. The system 150 can be used to dynamically assign resources and/or improve end node service provisioning by any of various systems described herein, including but not limited to distributed resource management systems, cloud orchestration systems, mobile edge computing systems, enterprise service provider systems, healthcare resource allocation systems, IoT device management systems, and/or smart infrastructure systems.

Generally, the orchestration pipeline can include operations performed by system 150. For example, the orchestration pipeline can include any one or more of an interfacing stage, a modeling stage, a planning stage, and/or an allocating stage. At least one (e.g., each) stage of the orchestration pipeline can include one or more components of system 150 configured to perform the functions described herein. In some implementations, one or more stages can be performed during training of AI models. Additionally, one or more stages can be performed during inference using the AI models.

The system 150 (e.g., implementing the orchestration pipeline) can receive context data corresponding with an end node and resource data corresponding to a plurality of network-accessible resources. In some implementations, the system 150 implementing the orchestration pipeline can apply the context data and the resource data as input to a prioritization model to cause the prioritization model to generate resource priority data for the end node. Additionally, the system 150 implementing the orchestration pipeline can determine at least one network-accessible resource from the plurality of network-accessible resources for orchestration at the end node based on the resource priority data. In some implementations, the system 150 implementing the orchestration pipeline can generate a resource orchestration plan identifying at least one assignment and sequence of the at least one network-accessible resource for the end node. Additionally, the system 150 implementing the orchestration pipeline can transmit the resource orchestration plan to an orchestration server for execution. In some implementations, the system 150 implementing the orchestration pipeline can receive outcome data corresponding to execution of the resource orchestration plan at the end node.

In some implementations, the interfacing stage can be the stage in the orchestration pipeline in which the system 150 can collect and/or receive context data from an end node and acquire resource data from one or more network-accessible resources. The system 150 can include at least one modeling system 154 (also referred to herein as a "health care computing system"). The modeling system 154 can receive context data corresponding with an end node (e.g., EN1 151, EN2 152, EN3 153) and resource data corresponding to a plurality of network-accessible resources (e.g., service node data, availability metadata, prioritization tags, resource identifiers, and/or any data identifying resource status). That is, the modeling system 154 can process incoming data associated with both end node characteristics and network-accessible resource properties to prepare data for downstream pipeline operations. For example, during the interfacing stage, the modeling system 154 can parse structured input from electronic records, external databases, and/or connected devices (e.g., one or more endpoints of the endpoint system 159).

In some implementations, the modeling system 154 can receive and/or otherwise identify the context data by receiving real-time (or near real-time) attribute updates from end nodes or querying external databases for historical and/or supplemental information. The context data (e.g., context matrix including vectors, arrays, logs, entry lists, event records, time series data, feature sets, device status reports, and/or streaming measurement values) include at least one of location identifier (e.g., GPS coordinates, facility ID), time interval (e.g., timestamp, duration), usage statistic (e.g., recent access frequency, data throughput rate), or operational status of the end node (e.g., online/offline state, battery level), sensor device readings (e.g., blood glucose measurement, fall detection status, heart rate measurement, ambient environmental reading, and/or any device-derived metric). That is, the context data can be information describing the operational status, current location, historical usage characteristics, sensor-detected event data (e.g., physiological measurement, device alert, and/or activity signal), and/or scheduled activities of the end node. The context data can provide multi-dimensional feature input for prioritization and allocation. For example, the modeling system 154 can aggregate demographic, usage, sensor data, and/or mobility data from sensors, user devices, and/or network logs. The location identifier and/or the time interval can include current location data (e.g., latitude and longitude coordinates) for the end node at a first time (e.g., 0900 hours UTC on a given calendar date). That is, the current location data can be received by the modeling system 154 in real-time (or near real-time) from a user device corresponding with the end node (e.g., end node 151, end node 152, and/or end node 153). The context data can further include features derived from sensor and device readings, including calculated movement and/or velocity metrics (e.g., based on accelerometer, gyroscope, or location stream data) that indicate activity patterns, immobility, and/or sudden changes in motion. For example, the modeling system 154 can determine from these data whether an end node is immobile for a predefined threshold period or detect a potential fall event, which can trigger prioritized allocation of monitoring, caregiver, or emergency response resources in the orchestration plan. It should be understood at least one (e.g., each) node of the system 150 can be represented as a computing system and/or computing device configured to interface and/or communicate with the various systems and devices of system 150.

For example, the modeling system 154 can receive sensor data from an end node configured with a blood glucose monitoring device that transmits measurement values at periodic intervals (e.g., every five minutes) via a wireless communication protocol (e.g., Bluetooth Low Energy, Wi- Fi, and/or cellular data). The sensor device of the end node can generate a data packet including a glucose measurement value, a timestamp (e.g., UTC millisecond precision), a device identifier, and/or a measurement status flag (e.g., valid reading, out-of-range alert, device error). The communication interface of the end node can forward each data packet to system 150 using a secure socket and/or RESTful API endpoint exposed by the orchestration platform. Upon receiving the measurement data, the modeling system 154 can parse the packet, extract the measurement value, timestamp, and/or device identifier, and/or store the data in a context matrix maintained in volatile memory or persistent database. The new sensor value can then be used as a feature for prioritization or as a real-time (or near real-time) trigger for generating resource allocation recommendations (e.g., flagging low glucose for rapid resource assignment, such as caregiver notification, emergency intervention service, or dietary resource delivery). Additionally, the modeling system 154 can combine the sensor reading with co-occurring context values, such as physical location and recent resource utilization to more accurately score assignment opportunities and sequence follow-up actions in the resource orchestration plan.

In some implementations, the end node can be any entity or device capable of generating, receiving, or transmitting data within the orchestration framework. For example, the end node can be a living creature, such as a human or an animal, that interacts with sensor devices or receives assigned resources. In other examples, the end node can be an autonomous robot, including a mobile robot or unmanned vehicle, that operates independently and communicates operational status or receives task assignments. The end node can also be a piece of instrumentation, such as a weather station, industrial sensor, and/or medical diagnostic device, which provides environmental measurements, equipment status, or other telemetry. The term "end node" as used herein can encompass any such entity, whether biological, robotic, and/or instrumental, that participates in data exchange, monitoring, and/or resource allocation within the described methods and systems.

In some implementations, the modeling system 154 can tag at least one of the plurality of network-accessible resources with availability metadata including the location identifier and the time interval. That is, the modeling system 154 can generate, associate, and/or update an availability record for at least one (e.g., each) network-accessible resource based on the geographic service area and periods of operation of the resource. For example, tagging can include writing a location identifier and time interval to a metadata field of the resource record (e.g., resource data) in a resource database or resource catalog. In this example, the modeling system 154 can filter available resources by matching the required location and time with the metadata tags, excluding resources not available for the current context of the end node. In some implementations, the resource data can include a subset of the plurality of network-accessible resources based on the availability metadata. That is, the modeling system 154 can generate and provide as input to downstream prioritization only those resources tagged as available for the current or scheduled location and time of the end node. For example, only transportation providers active in the region of the end node during the desired time interval can be included in the candidate resource list. In this example, unavailable resources can be dynamically excluded from the orchestration process, thereby reducing computing resource needs and complexity.

The end nodes (e.g., EN1 151, EN2 152, EN3 153) can be devices, patient devices, client systems, and/or endpoints configured for communication with the orchestration pipeline. That is, an end node can represent any network-accessible entity (e.g., patient) for which resource orchestration is performed. For example, the modeling system 154 can establish a communication session with an end node and retrieve context data via standardized networking protocols. The resource data can be metadata describing resource types, availability, configuration parameters, and/or capability attributes. That is, the resource data can represent the available options for assignment to an end node. For example, the modeling system 154 can retrieve a resource catalog and tag at least one (e.g., each) resource with real-time status information and availability constraints. In some implementations, the modeling system 154 can receive service data (e.g., resource data) including a menu of services (e.g., resource pool) indicative of one or more services (e.g., network-accessible resource). In some implementations, the modeling system 154 can receive patient data (e.g., context data) including one or more patient characteristics associated with the patient.

In some implementations, the modeling stage can be the stage in the orchestration pipeline in which the system 150 can process the context data and the resource data to generate resource priority data using a prioritization model. The modeling system 154 can apply the context data and the resource data as input to a prioritization model (e.g., the model(s) 155) to cause the prioritization model to generate resource priority data for the end node (e.g., EN1 151, EN2 152, EN3 153). That is, the modeling system 154 can compute, for at least one (e.g., each) input resource, a prioritization value based at least in part on the end node context data and the attributes of the resource. For example, during the modeling stage, the modeling system 154 can perform model-based inference to evaluate at least one (e.g., each) available network-accessible resource against the current condition and requirements of the end node.

In some implementations, the modeling system 154 can apply and/or otherwise model the context data and the resource data by executing machine learning algorithms, neural networks, and/or rule-based inference engines on the input features derived from both end node and resource data. Generating by applying can include the model(s) 155 evaluating weighted combinations of clinical and contextual parameters, assigning a numerical score to at least one (e.g., each) candidate resource, and outputting a ranked list of priorities. That is, the model(s) 155 can generate a priority for at least one (e.g., each) resource that quantitatively represents suitability for assignment to the end node. The resource priority data can be a set of values, at least one (e.g., each) value corresponding to a respective network-accessible resource and indicating priority relative to the current context of the end node. That is, the resource priority data can guide subsequent resource selection and orchestration planning. For example, the modeling system 154 can output a table associating at least one (e.g., each) network resource with a computed priority score and transmit this table to downstream allocation systems. In some implementations, the modeling system 154 can generate, based on the service data (e.g., resource data) and the patient data (e.g., context data), service priority data (e.g., resource priority data) including one or more service priorities corresponding to the one or more services (e.g., network-accessible resource) and associated with the patient (e.g., end node).

The modeling system 154 can include any one or more artificial intelligence models (e.g., machine learning models, supervised models, neural network models, deep neural network models), rules, heuristics, algorithms, functions, and/or various combinations thereof to perform operations including ranking, classification, prediction, detection, and/or resource assignment, such as generating priority scores for candidate resources, identifying optimal resource allocations, and/or detecting anomalous patterns in end node data. The prioritization model can include at least one of a neural network, a machine learning model, a rules-based model (e.g., decision tree, thresholding logic, finite state machine), or a statistical model (e.g., regression model, Bayesian classifier, Markov model). That is, the model(s) 155 can be a neural network and/or machine-learning (ML) model trained to generate and/or assign priority values (rankings, scores, classifications, and/or recommendations, such as a score on a scale from 0 to 1, an integer rank from 1 to 100, a likelihood classification, a resource utilization probability, a categorical label, and/or any value within a defined numerical or categorical range) to network-accessible resources based on end node context features and resource metadata. In some implementations, the modeling system 154 can output resource priority values. For example, the output can be a weighted array of priority values corresponding to at least one (e.g., each) available network-accessible resource. In this example, the output can be a weighted array of priority scores between 0 and 1 for each available network-accessible resource, such as 0.95 for a first resource, 0.81 for a second resource, 0.61 for a third resource, and 0.21 for a fourth resource. In another example, the output can be a recommendation list sorted by predicted effectiveness. In some implementations, the resource priority values can be provided to modeling system 154 to perform downstream resource selection, orchestration planning, or further iterative model training.

In some implementations, the modeling system 154 can execute one or more AI models (e.g., model(s) 155) by utilizing a modeling framework to improve the performance of the AI model during the modeling stage. The framework can include implementing techniques such as gradient descent, backpropagation, and/or distributed training to process large-scale datasets. The AI model(s) can incorporate mechanisms such as dropout regularization and weight pruning to maintain efficiency and prevent overfitting. For example, during execution, the modeling system 154 can partition input data into mini-batches, apply loss functions, and/or update model parameters iteratively. The AI models can support inference operations that include processing feature vectors, transforming raw input data, and/or generating probabilistic predictions and/or metrics. The modeling system 154 can integrate hardware accelerators such as GPUs or TPUs to address computational demands, for example when training large neural network models or performing real-time (or near real-time) inference on streaming data.

In some implementations, the modeling system 154 can evaluate trained models using various metrics (e.g., precision, recall, and/or F1 score) and/or any validation criteria to determine readiness for deployment and/or inference operations. The evaluation can include analyzing model performance on validation datasets, testing datasets, or real-world data inputs to assess consistency and robustness. For example, the modeling system 154 can compare model predictions against ground truth data to determine accuracy metrics, error rates, and/or confidence intervals. In another example, the modeling system 154 can track performance variations over multiple evaluation cycles to identify potential degradation and/or drift in model accuracy. The evaluation can include the modeling system 154 applying techniques such as cross-validation, Monte Carlo simulations, and/or adversarial testing to measure resilience against noise or distributional shifts. In some implementations, the modeling system 154 can generate performance metrics and/or data structures including metric values, confusion matrices, and/or calibration plots to identify model effectiveness. The performance metrics and/or data structures can be used to facilitate retraining procedures, model adjustments, and/or fine-tuning processes if evaluation criteria are not met. The modeling system 154 can integrate threshold-based criteria, such as enforcing an F1 score above a predefined value, before permitting the model(s) 155 to be deployed for inference. In some implementations, model evaluation can include automated testing pipelines that perform predefined test cases, analyze false positive and false negative rates, and/or apply statistical significance tests to validate improvements.

In some implementations, the modeling system 154 can include at least one AI model (e.g., model(s) 155). The model(s) 155 can include an input layer, an output layer, and/or one or more intermediate layers, such as hidden layers, which can at least one (e.g., each) have respective nodes. That is, the model(s) 155 can receive as input one or more feature vectors including context data and resource data, propagate feature activations through one or more hidden layers that apply learned transformations, and output prediction values or resource priority assignments at the output layer. For example, the input layer can map normalized input data to activation values for processing by subsequent hidden layers. For example, the output layer can provide a set of resource priority values or classification tags corresponding to network-accessible resources assigned to the end node. For example, the intermediate layers can apply nonlinear operations, weight matrices, and/or normalization steps to extract latent features and improve model accuracy.

In some implementations, the system 150 can configure (e.g., train, update, fine tune, apply transfer learning to) the model(s) 155 by modifying or updating one or more parameters, such as weights and/or biases, of various nodes of the model(s) 155 responsive to evaluating estimated outputs of the model(s) 155 (e.g., generated in response to receiving training examples in a training dataset, such as a training dataset including labeled context data, assigned resource records, historical outcome data, and/or expert-provided annotations). The modeling system 154 can be or include various neural network models, including models that can for operating on or generating data including but not limited to context vectors, time-series sensor signals, structured resource metadata, and/or various combinations thereof. In some implementations, the modeling system 154 can the prioritization model based on at least a portion of the outcome data. That is, the modeling system 154 can adjust model parameters of the prioritization model in response to differences between predicted outputs and/or actual outcomes recorded for resource assignments. For example, the modeling system 154 can update weights and/or biases of nodes in the model(s) 155 using a gradient descent optimization routine after comparing estimated resource priorities to observed effectiveness metrics derived from outcome data corresponding to executed resource orchestration plans.

In some implementations, the modeling system 154 can be configured (e.g., trained, updated, fine-tuned, has transfer learning performed, etc.) based at least on the training data of the at least one training dataset (e.g., context data, resource assignment labels, outcome results). For example, one or more example context vectors and/or resource assignment scenarios of the training data can be applied (e.g., by the system 150 and/or in a pre-training and/or tuning process performed by the system 150 or another system) as input to the modeling system 154 to cause the modeling system 154 to generate an estimated output. The estimated output can be evaluated and/or compared with target assignment labels (or outcome values) of the training data that correspond with the one or more example context vectors and/or resource assignment scenarios, and the model(s) 155 of the modeling system 154 can be updated based at least on the comparison between predicted and target values. For example, based at least on an output of a loss function comparing estimated and ground truth resource assignment outcomes, one or more parameters (e.g., weights and/or biases) of model(s) 155 of the modeling system 154 can be updated.

In some implementations, the modeling system 154 can implement and/or otherwise facilitate a pre-training in which model(s) 155 is trained on large-scale, unstructured datasets to learn foundational representations (e.g., generic feature embeddings, entity relationships, and/or any contextual parameter distributions). The pre-training can include self-supervised learning techniques such as masked token prediction, next-token prediction, contrastive learning, and/or denoising objectives to develop generalized feature representations. For example, model(s) 155 can be exposed to large corpora of context data, resource assignment logs, and/or textual descriptions to extract statistical patterns, semantic relationships, and/or latent structures. In another example, model(s) 155 can apply unsupervised clustering techniques to identify recurrent patterns and correlations in the training data (e.g., contextual similarity, co-occurrence of resource assignments, and/or any pattern of interest). The pre-training phase can include updating model parameters based on loss functions computed from predicting missing or corrupted data points. The modeling system 154 can apply distributed training techniques, including data parallelism, model parallelism, and/or pipeline parallelism, to optimize the computational efficiency of pre-training. The output (e.g., generalized embedding weights, learned feature representations, model checkpoint files) of the pre-training phase can be used to initialize model(s) 155 for subsequent fine-tuning on domain-specific tasks.

In some implementations, the modeling system 154 can implement and/or otherwise facilitate fine-tuning in which model(s) 155 is updated to specific tasks (e.g., resource assignment for a target application, end node risk prediction, and/or any domain-specific classification) using domain-specific training datasets (e.g., operational logs, labeled intervention outcomes, and/or any context-specific set). The fine-tuning process can include supervised learning, reinforcement learning, and/or contrastive learning to refine the pre-trained representations. For example, the modeling system 154 can update the neural network weights by minimizing prediction errors on labeled assignment data from a recent deployment. The modeling system 154 can update model(s) 155 by adjusting weights, biases, and/or layer-specific parameters based on task-specific loss functions. For example, fine-tuning can include backpropagation-based updates using labeled datasets where model(s) 155 can be trained to minimize classification errors, prediction uncertainties, and/or inference inconsistencies. In some implementations, fine-tuning can be performed using techniques such as low-rank adaptation (LoRA), adapter layers, and/or selective parameter freezing to reduce computational costs while preserving generalization capabilities. The modeling system 154 can iteratively evaluate model(s) 155 on validation datasets (e.g., test splits, holdout samples, and/or any representative evaluation set) to track performance changes, mitigate overfitting, and/or determine convergence criteria. Fine-tuning outputs can be evaluated against reference benchmarks (e.g., standardized classification metrics, resource allocation accuracy, and/or any external evaluation set) to assess task alignment, efficiency improvements, and/or robustness against adversarial inputs.

In some implementations, the modeling system 154 can implement and/or otherwise facilitate retrieval-augmented generation (RAG) models to improve output quality of model(s) 155 by incorporating external knowledge sources. The RAG architecture can include a retrieval system and a generation system, where the retrieval system of modeling system 154 can fetch relevant documents, embeddings, or structured data (e.g., knowledge base entries, annotated resource graphs, time-series records, and/or any indexed context) from knowledge bases (e.g., resource assignment databases, medical literature data stores, regulatory repositories, and/or any organizational information set), and the generation system of modeling system 154 can synthesize responses using retrieved content. The modeling system 154 can utilize vector search techniques such as FAISS, approximate nearest neighbor (ANN) search, and/or BM25 ranking to identify relevant retrieval candidates. For example, model(s) 155 can retrieve contextually relevant passages (e.g., device instructions, case studies, context summaries, and/or any structured population descriptor) from an indexed database and use the retrieved content as additional input for generating responses. In some implementations, the modeling system 154 can dynamically update retrieval parameters based on query complexity, information density, and/or response ambiguity. The retrieval process can be reinforced using feedback mechanisms, where low-confidence generations trigger additional retrieval iterations. The modeling system 154 can integrate hybrid approaches that combine parametric memory from model(s) 155 with non-parametric retrieval sources to balance computational efficiency and factual accuracy.

In some implementations, the modeling system 154 can implement and/or otherwise facilitate a sparse expert-based model architecture. The model(s) 155 can utilize a Mixture of Experts (MoE) framework, where a subset of expert networks can be dynamically activated per inference step based on input characteristics. For example, when a multimodal input is received the model(s) 155 can selectively activate image specialists, time-series analysts, and/or text processing experts to process relevant portions of the data. The MoE structure can include multiple specialized sub-networks, at least one (e.g., each) trained on different aspects of data processing, and a gating mechanism that selects the relevant experts for a given query. In some implementations, the modeling system 154 can include optimizations such as multi-head latent attention, which reduces memory overhead by compressing and reconstructing key-value pairs dynamically, minimizing cache storage requirements during inference. The model(s) 155 can integrate both local and global attention mechanisms, where local attention can process immediate token relationships and global attention can capture long-range dependencies. Additionally, the model(s) 155 can implement soft token merging to reduce redundant input tokens and dynamic token inflation to restore critical details during later processing stages. For example, the model(s) 155 can perform adaptive token pruning to condense highly repetitive input sequences, thereby reducing inference latency. The modeling system 154 can further improve inference performance by employing hardware acceleration techniques, including tensor parallelism and/or memory-efficient caching strategies. The system 150 can execute the sparse expert-based model architecture (e.g., the model(s) 155) for natural language processing, reasoning-based tasks, structured data transformation, and/or multimodal data generation.

In some implementations, the planning stage can be the stage in the orchestration pipeline in which the system 150 can select and/or identify at least one network-accessible resource for assignment to the end node based at least in part on the resource priority data. The modeling system 154 can determine at least one network-accessible resource from the plurality of network-accessible resources for orchestration at the end node 151, end node 152, and/or end node 153 based on the resource priority data. That is, the modeling system 154 can evaluate the resource priority data generated by a prioritization model and select one or more resources with the highest priority ranking for further allocation. For example, during planning stage the modeling system 154 can compare priority scores for at least one (e.g., each) candidate resource and select resources with scores exceeding a defined threshold for inclusion in the resource orchestration plan.

In some implementations, the modeling system 154 can determine and/or otherwise identify the network-accessible resource by ranking, filtering, and/or otherwise processing the plurality of network-accessible resources in accordance with rules based on operational constraints, availability, and/or scheduling requirements. The network-accessible resource can be a service, application, physical item, and/or network function that is tagged with availability metadata and assigned a computed priority value. That is, the network-accessible resource can represent any element suitable for provision to the end node in accordance with the orchestration pipeline requirements. For example, the modeling system 154 can identify transportation services, communication services, and/or in-home device provisioning resources as eligible for assignment to a given end node.

Orchestration can include the modeling system 154 managing the allocation of selected resources to corresponding end nodes, resolving dependencies among resource types, and/or adjusting plans based on new resource or context information. That is, the modeling system 154 can continuously refine and update resource assignments responsive to changing network conditions and/or end node status. For example, the modeling system 154 can add, remove, and/or replace resources from a pending allocation list based on updated resource priority data or availability constraints. In some implementations, the modeling system 154 can determine, based on the service data (e.g., resource data) and the patient data (e.g., context data), and the service priority data (e.g., the resource priority data), at least one recommended service (e.g., at least one network-accessible resource) of the one or more services to provide to the patient (e.g., EN1 151, EN2 152, EN3 153).

In some implementations, the allocating stage can be the stage in the orchestration pipeline in which the system 150 can generate a resource orchestration plan including at least one assignment and sequencing of selected network-accessible resources for targeted delivery to the end node. The resource orchestration plan can include two or more network-accessible resources for provision to the end node based on at least one dependency (e.g., completion of diagnostic testing prior to medication delivery, transportation scheduled before a clinic visit, telehealth session initiated after data upload, and/or any sequential or conditional relationship) or criteria (e.g., priority score threshold, resource availability window, minimum required service level, and/or any cost constraint). The modeling system 154 can generate a resource orchestration plan identifying at least one assignment and sequence of the at least one network-accessible resource for the end node (e.g., EN1 151, EN2 152, EN3 153). That is, the modeling system 154 can create a data structure, such as a plan object or ordered list, that defines the set of resources assigned to an end node and specifies the sequence or timing of delivery. For example, during allocating stage the modeling system 154 can use dependency analysis to order resources (e.g., scheduling transportation before a clinic visit, assigning medication delivery after completion of a laboratory test, sequencing a follow-up telecommunication resource after a remote diagnostic procedure, and/or arranging caregiver dispatch following confirmation of device installation) and resolve conflicts among concurrent assignments.

In some implementations, the modeling system 154 can receive, from at least one external service node (e.g., at least one endpoint of the endpoint system 159), external service node data corresponding to at least one of the plurality of network-accessible resources. That is, the modeling system 154 can receive a structured status message, service capability update, or availability notification. The external service node data can be a message containing real-time (or near real-time) resource capacity, operational status, scheduled availability window, and/or maintenance notification. For example, the external service node data can include a JSON payload (e.g., structured data object including at least one key-value pair representing resource attributes, status, and/or parameters) with service uptime, current load, and/or next available interval for the resource. In some implementations, the modeling system 154 can update the resource priority data based on the external service node data. That is, the modeling system 154 can modify the priority scores for one or more resources to reflect updated availability, capacity, and/or operability as reported in the external service node data. For example, the modeling system 154 can decrease a priority score if the resource is scheduled for downtime, and/or increase a priority if the resource becomes newly available or has surplus capacity.

In some implementations, the modeling system 154 can transmit, to the at least one external service node (e.g., the endpoint system 159), a resource allocation request message (e.g., a network protocol message, such as a REST API call) corresponding to at least one of the plurality of network-accessible resources. That is, the modeling system 154 can generate and send a request for resource allocation that specifies the resource identifier, desired time window, and/or required service parameters. For example, the modeling system 154 can transmit a REST API call (e.g., a network protocol request by a client to a server that exposes a RESTful API, sent over HTTP or HTTPS, and specifying an endpoint, method, headers, and/or request body) with a JSON payload identifying the requested resource, including the time, location, and assignment criteria to the external service node.

In some implementations, the modeling system 154 can receive, from the at least one external service node (e.g., the endpoint system 159), at least one resource provisioning response message (e.g., a network response message, such as a provisioning offer, capability advertisement, or allocation confirmation) including a bid parameter. The bid parameter can correspond to at least one of an availability (e.g., available intervals, expected downtime, maintenance schedule), a cost (e.g., unit price, usage fee, subscription rate), a capability (e.g., supported throughput, maximum concurrent sessions, redundancy level), and/or an assignment (e.g., duration of assignment, exclusivity, priority slot allocation) for a corresponding network-accessible resource. That is, the resource provisioning response can communicate the real-time (or near real-time) status of the resource, terms for assignment, and/or constraints on use. For example, the provisioning response message can indicate a resource is available between 08:00 and 18:00, with a cost of $0.25 per minute and bandwidth up to 100 Mbps. In another example, the response can include a flag marking the resource as unavailable during maintenance. In yet another example, the response can allocate priority to requests matching a specific region or user type.

In some implementations, the modeling system 154 can determine an inclusion of the corresponding network-accessible resource in the resource orchestration plan based at least on the at least one resource provisioning response message. That is, the modeling system 154 can evaluate the received bid parameters and select resources that satisfy the defined availability, cost, capability, and/or assignment requirements for the orchestration cycle. For example, the modeling system 154 can include a resource in the orchestration plan if its provisioning response message indicates sufficient availability and an acceptable price. In this example, the modeling system 154 can exclude a resource whose response indicates a scheduling conflict, excessive cost, and/or insufficient technical capability.

In some implementations, the modeling system 154 can generate and/or otherwise construct the resource orchestration plan by combining information regarding resource identity, assignment timing, dependencies, and/or priority as computed in prior pipeline stages. The resource orchestration plan can be a digital record or message packet encoding assignment instructions and sequencing metadata for execution by the orchestration server. Generally, the resource orchestration plan can be an actionable schedule that directs automated and/or manual delivery of selected resources to the end node in an improved and coordinated manner. That is, the resource orchestration plan can provide the details for a downstream system and/or service node to execute the prescribed assignments. For example, the modeling system 154 can generate an XML or JSON document specifying the assignment of transportation services on a certain date and follow-up communication two days afterward.

In some implementations, the assignment can be one or more resource elements identified for delivery and/or execution for the end node. That is, the assignment can include physical and/or virtual actions to fulfill a planned intervention. For example, the assignment can include a dispatch order for a courier or a configuration update for a remote monitoring device. In some implementations, the sequence can be an ordered list and/or a dependency graph indicating timing, prerequisite relationships, and/or conditions for resource execution. That is, the sequence can reflect an order for fulfilling the orchestration plan. For example, the sequence can require telecommunication setup to occur prior to a scheduled virtual consult. In some implementations, identifying the assignment and sequence for the end node 151, end node 152, and/or end node 153 can include evaluating all computed resource priorities, resolving dependencies, and/or ordering resources based on system policies and end node context information. In some implementations, the modeling system 154 can generate, based on the service data (e.g., resource data and the determined network-accessible resource), the patient data (e.g., context data), the service priority data (e.g., resource priority data), and the determination of the at least one recommended service (e.g., network-accessible resource), recommended and sequenced service data including a recommended service sequence for providing the at least one recommended service to the patient (e.g., resource orchestration plan). In some examples, the assignment can further include a pushed intervention, such as transmitting a reminder notification to a mobile device of the end node prompting the end node to take a specific action (e.g., attend an appointment, take medication, perform a measurement). The system 150 can then monitor subsequent end node activity and/or sensor data to verify whether the prompted action was completed, and/or update outcome records or trigger follow-up actions accordingly.

In some implementations, the allocating stage can be the stage in the orchestration pipeline in which the system 150 can transmit a completed resource orchestration plan for execution. The modeling system 154 can transmit the resource orchestration plan to the orchestration server 108 for execution. That is, the modeling system 154 can format and send a command or message containing the resource orchestration plan to the orchestration server 108 over a network connection. For example, during allocating stage the modeling system 154 can initiate an automated communication session to transfer the plan using a secure messaging protocol.

In some implementations, the modeling system 154 can transmit and/or otherwise provide the resource orchestration plan by invoking a web API, posting to a message broker, and/or using a publish/subscribe mechanism. The orchestration server 108 can execute the resource orchestration plan by instantiating assigned resources, monitoring delivery and completion of each resource, and/or storing associated status (e.g., delivery confirmation, completion timestamp, error code) or outcome data. That is, the executing can include triggering service node operations, issuing control signals to relevant devices, and/or collecting feedback on execution status. For example, the modeling system 154 can cause the orchestration server 108 to launch a scheduling process that dispatches transportation, schedules follow-up appointments, initiates medication delivery, triggers diagnostic testing, and/or confirms communication with the end node. In some implementations, the modeling system 154 can transmit the recommended and sequenced service data (e.g., collectively the resource orchestration plan) to the orchestration server 108 for further coordination and outcome tracking.

In some implementations, the context data can include at least one clinical characteristic (e.g., diagnosis code, laboratory result, prescribed medication, and/or identification of a chronic condition) and/or at least one social characteristic (e.g., employment status, housing status, family support indicator, and/or transportation access status) of the end node. At least one of the plurality of network-accessible resources can correspond to a categorization as a clinical resource and/or a social resource. That is, the system 150 can categorize at least one resource as a clinical resource and/or a social resource. For example, a medication delivery resource and/or a blood test scheduling resource can be categorized as a clinical resource. In another example, a transportation resource and/or a food delivery resource can be categorized as a social resource.

In some implementations, the modeling system 154 can cause, based on the categorization of the at least one network-accessible resource, a presentation of a notification on a user device (e.g., EN1 151, EN2 152, and/or EN3 153) of the end node corresponding to the clinical resource and/or the social resource. That is, the modeling system 154 can cause display of a notification on a user device of the end node associated with the clinical resource and/or the social resource. For example, the modeling system 154 can provide a push notification regarding scheduling of a remote diagnostic test and/or a transportation reminder for an end node. In this example, the notification can be visible on a mobile phone and/or a tablet device of the end node.

In some implementations, the modeling system 154 can cause, based on the categorization of the at least one network-accessible resource, an initiation of execution of the clinical resource or the social resource to the end node. That is, the modeling system 154 can cause initiation of execution of the clinical resource and/or the social resource assigned to the end node. For example, the modeling system 154 can request a prescription refill from a pharmacy resource and/or schedule a home care visit as a service of the network-accessible resources. In this example, the system 150 can log the initiation timestamp and/or the status of the initiation event.

In some implementations, the modeling system 154 can cause, based on the categorization of the at least one network-accessible resource, an allocation of the clinical resource or the social resource to the end node. That is, the modeling system 154 can cause allocation of the clinical resource and/or the social resource to the end node. For example, the modeling system 154 can allocate a remote monitoring device and/or a caregiver visit to the end node based on the resource orchestration plan. In this example, the modeling system 154 can update a system database to record the allocation event and/or notify a service provider regarding the allocation. In some implementations, the modeling system 154 can update the outcome data corresponding to the end node based on at least one of (i) the presentation of the notification, (ii) the initiation of execution, and/or (iii) the allocation. In some examples, the allocation can also be triggered by the absence of expected data from the end node, such as a missing confirmation of medication intake and/or a missed scheduled measurement. If the requested data is not received within a defined time window (e.g., 30 minutes, 5 hours, 1 day), the modeling system 154 can automatically allocate an appropriate resource (e.g., a follow-up call, caregiver dispatch, or automated reminder) to address the potential issue.

In some implementations, the modeling system 154 can receive resource availability data (e.g., operating status, geographic coverage, service period, and/or contact information) corresponding to a geographical availability (e.g., service region identifier and/or zip code) and/or a time availability (e.g., operating hours and/or blackout period) of at least one of the plurality of network-accessible resources. Receiving can include pulling resource status via an API and/or receiving a periodic update from a message broker. For example, the modeling system 154 can receive an indication that a transportation service is operational in a zip code during a certain time window and/or detect an update regarding the end of an availability interval of the provider. In some implementations, the modeling system 154 can determine, based on at least one of the location identifier, the time interval, the resource availability, the usage statistic, and/or the operational status of the end node, and/or the resource availability data, at least one available network-accessible resource of the plurality of network-accessible resources for the end node. Determining can include filtering by matching a current region identifier and/or current time to a region and/or time value in the metadata of the resource. For example, the modeling system 154 can determine a transportation provider and/or a lab service is available for the end node at a current time based on received data. In some implementations, the modeling system 154 can update the resource data based on the at least one available network-accessible resource. Updating can include setting a flag and/or removing an unavailable resource from the candidate pool. For example, the modeling system 154 can mark a resource as unavailable due to blackout period and/or update a last-seen availability timestamp to reflect new status data. The resource availability can be a quantitative value or indicator (e.g., a fuel gauge, remaining capacity, percent utilization, current inventory level, supply status, threshold alert, and/or any measure of available resource quantity) that reflects how much of the resource is presently accessible for allocation and whether proposed utilization will approach or exceed depletion levels.

The system 150 can include at least one orchestration server 108 (also referred to herein as an "orchestration server" or a "central service provider computing system"). The orchestration server 108 can receive resource orchestration plans from the modeling system 154 and coordinate execution by delegating assignments to service nodes, tracking completion status, and/or recording outcomes. That is, the orchestration server 108 can receive resource orchestration plans and parse assignment and/or sequence instructions for downstream implementation. For example, the orchestration server 108 can distribute scheduling commands to service nodes, provision network resources, and/or initiate automatic notifications to end nodes. In this example, resource execution status can be monitored to verify successful delivery and/or to initiate corrective actions if issues arise. The orchestration server 108 can communicate and/or otherwise interface with an endpoint system 159 by exchanging messages, transmitting control commands, and/or synchronizing status data through one or more network channels. For example, the orchestration server 108 can send configuration data to an IoT endpoint, trigger alerts, and/or perform remote diagnostics.

Additionally, the orchestration server 108 can transmit outcome data corresponding to execution of the resource orchestration plan at the end node (e.g., EN1 151, EN2 152, EN3 153). That is, the outcome data can identify at least one service node (e.g., SN1 156, SN2 157, SN3 158) participating in the assignment, delivery, or execution process. The service nodes 156, 157, and 158 (e.g., SN1, SN2, SN3) can be network-connected resources or devices capable of provisioning, monitoring, or controlling assigned resources. That is, a service node (e.g., SN1, SN2, SN3) can initiate resource transfer, collect real-time operational metrics, and/or log completion events for planned assignments. Using and/or interfacing with the endpoint system 159, the orchestration server 108 can coordinate deployment of physical or virtual resources, manage feedback data, and/or update summary records for auditing and continuous improvement. That is, the orchestration server 108 can close the resource delivery loop, ensure full-cycle orchestration, and/or synchronize reporting to other components of the system 150. For example, the orchestration server 108 can aggregate completion data from service nodes, reconcile with the resource orchestration plan, and/or update outcome metrics in system data stores.

The system 150 can include at least one endpoint system 159. Generally, the endpoint system 159 can receive, execute, and/or monitor assigned resources in accordance with the resource orchestration plan provided by the orchestration server 108. That is, the endpoint system 159 can function as an operational node that performs actions, reports status, and/or collects operational data associated with resource assignments. For example, the endpoint system 159 can activate a device, initiate a scheduled service, and/or generate performance metrics based on execution instructions. In this example, the endpoint system 159 operates as a recipient of specific resource allocations and/or as a source of feedback to the orchestration pipeline.

The orchestration server 108 can communicate and/or otherwise interface with the endpoint system 159 by transmitting resource orchestration plans, assignment instructions, status requests, and/or data synchronization messages over a network connection. For example, the modeling system 154 can generate a sequence of commands based on the resource orchestration plan and forward the commands to the orchestration server 108 for downstream execution at the endpoint system 159. Additionally, the modeling system 154 can communicate and/or otherwise interface with the endpoint system 159 by receiving feedback data, polling for operational status, and/or querying for execution results using an application programming interface (API) or similar data exchange mechanism. For example, the modeling system 154 can retrieve event logs and/or sensor data from the endpoint system 159 to confirm completion of assigned resource actions.

In some implementations, the allocating stage can be the stage in the orchestration pipeline in which the system 150 can monitor and/or collect outcome data corresponding to execution of the resource orchestration plan at the end node. The modeling system 154 can receive outcome data corresponding to execution of the resource orchestration plan at the end node. That is, the modeling system 154 can receive, parse, and/or store operational feedback, event outcomes, and/or execution metrics reported by the endpoint system 159, the orchestration server 108, and/or associated service nodes. For example, during allocating stage the modeling system 154 can record delivery confirmation, track completion status, and/or detect service interruption based on returned data streams.

In some implementations, the modeling system 154 can receive and/or otherwise identify the outcome data by collecting status updates, polling monitoring subsystems, and/or subscribing to automated reporting messages generated by the endpoint system 159 or the orchestration server 108. The outcome data can be structured as timestamped records encoding completion status, error codes, usage statistics, and/or performance measures for at least one (e.g., each) assigned resource. That is, the execution of the resource orchestration plan can cause the generation of outcome data indicating whether the assigned resource was delivered, utilized, and/or requires follow-up action. For example, the modeling system 154 can receive data showing a successful file transfer, missed appointment, and/or updated device setting as evidence of resource allocation outcome. In some implementations, the modeling system 154 can receive patient outcome data (e.g., outcome data) indicative of one or more patient outcomes associated with provision or attempted provision of the at least one recommended service (e.g., using a service node) to the patient (e.g., end node).

In some implementations, the allocating stage can be the stage in the orchestration pipeline in which the system 150 can update the context data and/or resource priority data based on newly received outcome data from the execution of the resource orchestration plan. The modeling system 154 can update the context data and/or resource priority data based on the outcome data and/or resource orchestration plan. That is, the modeling system 154 can revise stored attributes, operational metrics, and/or predicted priorities for subsequent resource planning based on observed outcomes. For example, during allocating stage the modeling system

154 can increase the priority assigned to a successful intervention or decrease the priority for an unsuccessful or unused resource.

In some implementations, the modeling system 154 can update and/or otherwise modify the context data and/or resource priority data by integrating the outcome data received from the endpoint system 159, recalculating risk scores, and/or updating eligibility criteria for future orchestration events. The context data and/or resource priority data can be updated to reflect changes in end node status, operational environment, and/or intervention effectiveness. For example, the context data can be updated to include a new event, such as recent travel or device usage. In another example, the resource priority data can be updated to reflect a decreased need for a resource following confirmed delivery and/or to increase priority of alternatives if an assigned resource was not successfully executed. In some implementations, the modeling system 154 can modify, based on the recommended and sequenced service data (e.g., resource orchestration plan) and the patient outcome data (e.g., outcome data), the patient data (e.g., context data) and/or the service priority data (e.g., resource priority data).

Still referring to FIG. 1A, the system 150 can receive context data (e.g., a context matrix storing operational parameters, usage history, location identifiers, time intervals, resource demand signals, and/or demographic indicators for at least one end node) and resource data (e.g., availability metadata, capability descriptors, assignment cost values, and/or access time windows for a plurality of network-accessible resources) as inputs to a prioritization model. The system 150 can apply these inputs to the prioritization model to generate resource priority data (e.g., a matrix or multidimensional array of scored assignments, ranked lists, weighted resource vectors, and/or classification outputs), which can reduce memory usage by storing relevant priority values rather than tracking a full enumeration of end node and resource state combinations. Rather than evaluating every possible assignment and sequencing directly, the system 150 can generate a resource orchestration plan (e.g., a data structure identifying a subset of prioritized resource assignments, an ordered schedule, or a constrained allocation map) by filtering and sequencing only resources associated with the highest priority values. This approach reduces the computational complexity from $O(mn^2)$ to $O(mn+km)$, where m is the number of end nodes, n is the number of resources, and k is the number of resource assignments per end node. By using structured context data, resource data, and outcome data received from endpoint systems as elements, the system 100 can perform assignment, sequencing, and real-time plan updating with lower memory use and faster runtime as compared to systems requiring full assignment grid construction or iterative exhaustive searches, thereby supporting responsive resource orchestration and efficient network operations in distributed environments.

The integration of sensor-derived context data with the data pipeline of system 150 can provide additional improvements in computational efficiency, response time, and/or model precision for resource orchestration in distributed networks. When the context matrix includes real-time and/or recent measurements from sensors such as glucose monitors (e.g., timestamped blood glucose levels), fall detection devices (e.g., binary fall event indicators with time and location metadata), and/or biometric wearables (e.g., continuous heart rate, motion, or sleep data), the prioritization model can process a richer feature set that reflects the current operational state of the end node. This high-frequency, event-driven input can allow the prioritization model to update resource priority data and adjust resource orchestration plans as new sensor readings are received, reducing latency between a significant end node event and corresponding assignment of a resource. For example, detection of an out-of-range glucose value can trigger high-priority assignment of clinical resources, while a fall sensor alert can result in immediate sequencing of emergency response or caregiver dispatch resources. By limiting plan recomputation and memory usage to only affected end nodes and relevant resources in response to sensor events, system 150 can achieve further reductions in both runtime complexity and data storage footprint. Aggregation of sensor events and outcomes in the context matrix also supports model retraining, plan optimization, and/or generation of analytics for continuous improvement in network-wide orchestration performance.

Figure 1B:
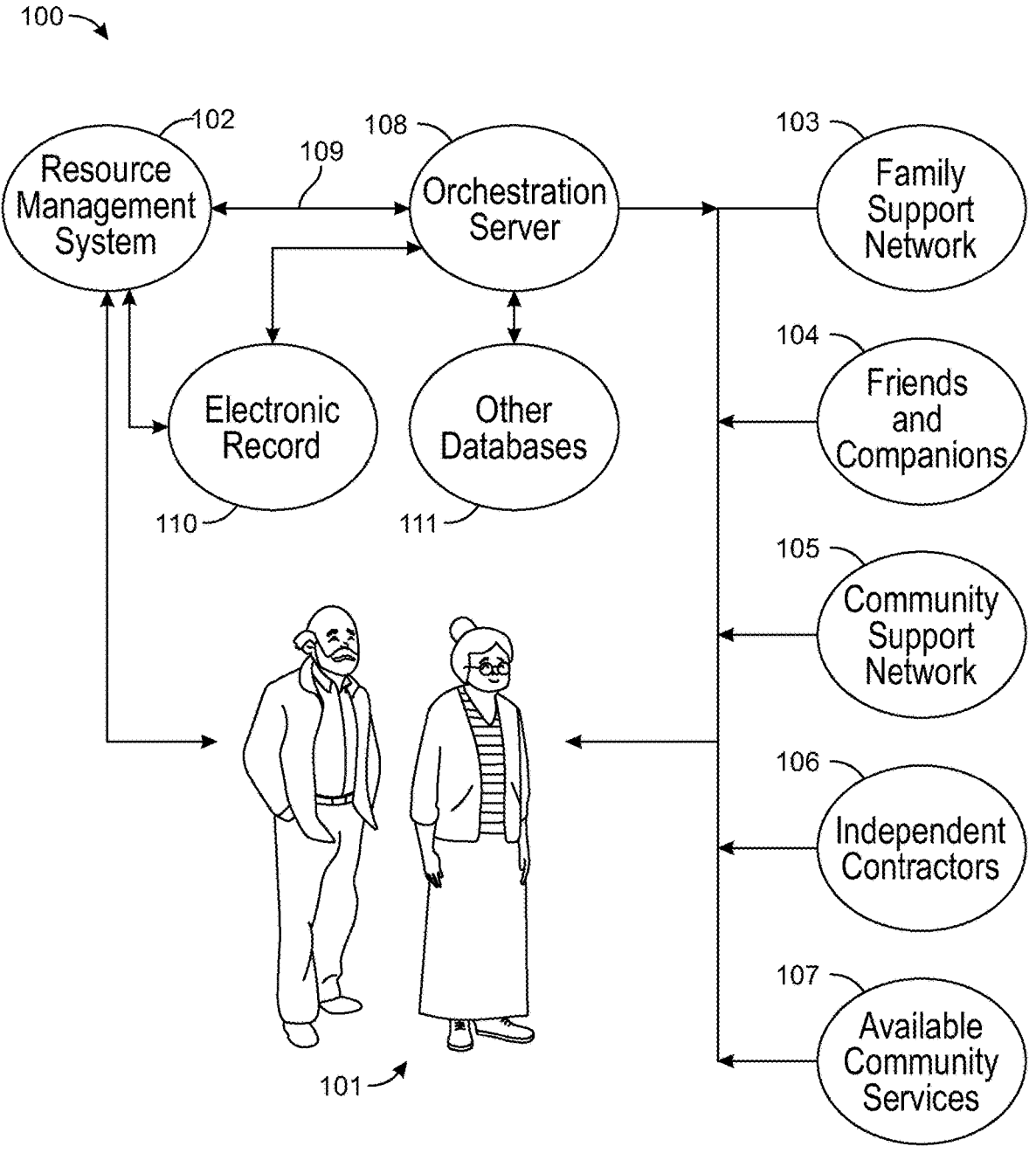
FIG. 1B illustrates the elements that interact to provide ERO or TRO.

By way of example, the elements in the network of resources that interact to provide ERO and/or TRO are illustrated in FIG. 1B. There can be other elements not mentioned in this description and omission of those other elements is not intended to be limiting on the disclosure. End nodes interact with the resource management system ("RMS") 102, which can include remote sites (e.g., hospitals, data centers, distributed server nodes, and/or any regional processing locations), out end node clinics (e.g., outpatient), family care physicians, specialist physicians, pharmacies, urgent care facilities, aged care facilities, nursing homes, in-home visits from a healthcare professional ("HCP"), and the like. The RMS 102 generally uses an electronic records 110 (e.g., Electronic Medical Record ("EMR"), centralized resource registry, distributed ledger, and/or any structured data repository). The system can be configured to access other databases 111 for information not generally available in the EMR and can also receive data entered manually.

Other elements of the community which are not normally considered as part of the resource management system 102 can impact the outcomes of the end node and quality of care. These elements contribute to the SDOH which have been shown to have an impact on the health and well-being of the end node. See for example, Braverman, Paula, Susan Egerter, and David R. Williams. "The social determinants of health: coming of age." Annual review of public health 32 (2011): 381-398. It has been suggested that provision of mobile health aligned with the SDOH would provide better outcomes (Rogers, C. C., Jang, S. S., Tidwell, W., Shaughnessy, S., Milburn, J., Hauck, F. R., Williams, I. C., & Valdez, R. S. (2023). Designing mobile health to align with the social determinants of health. Frontiers in Digital Health, 5, https://doi.org/10.3389/fdgth.2023.1193920).

These elements can include the family support network 103 (co-resident, local, or extended family), friends and companions 104 (which can include animal companions and pets), the community support network 105 (which can include churches, volunteer and charitable resources such as meals on wheels), independent contractors 106 which provide paid resources as requested (e.g., transportation resources (e.g., taxis, Uber), food delivery resources, house cleaning and laundry resources, physical therapists, broad band internet and mobile phone resource), and available community services 107 such as social workers, translation resources, employment assistance, legal aid, and tax help.

Figure 3:
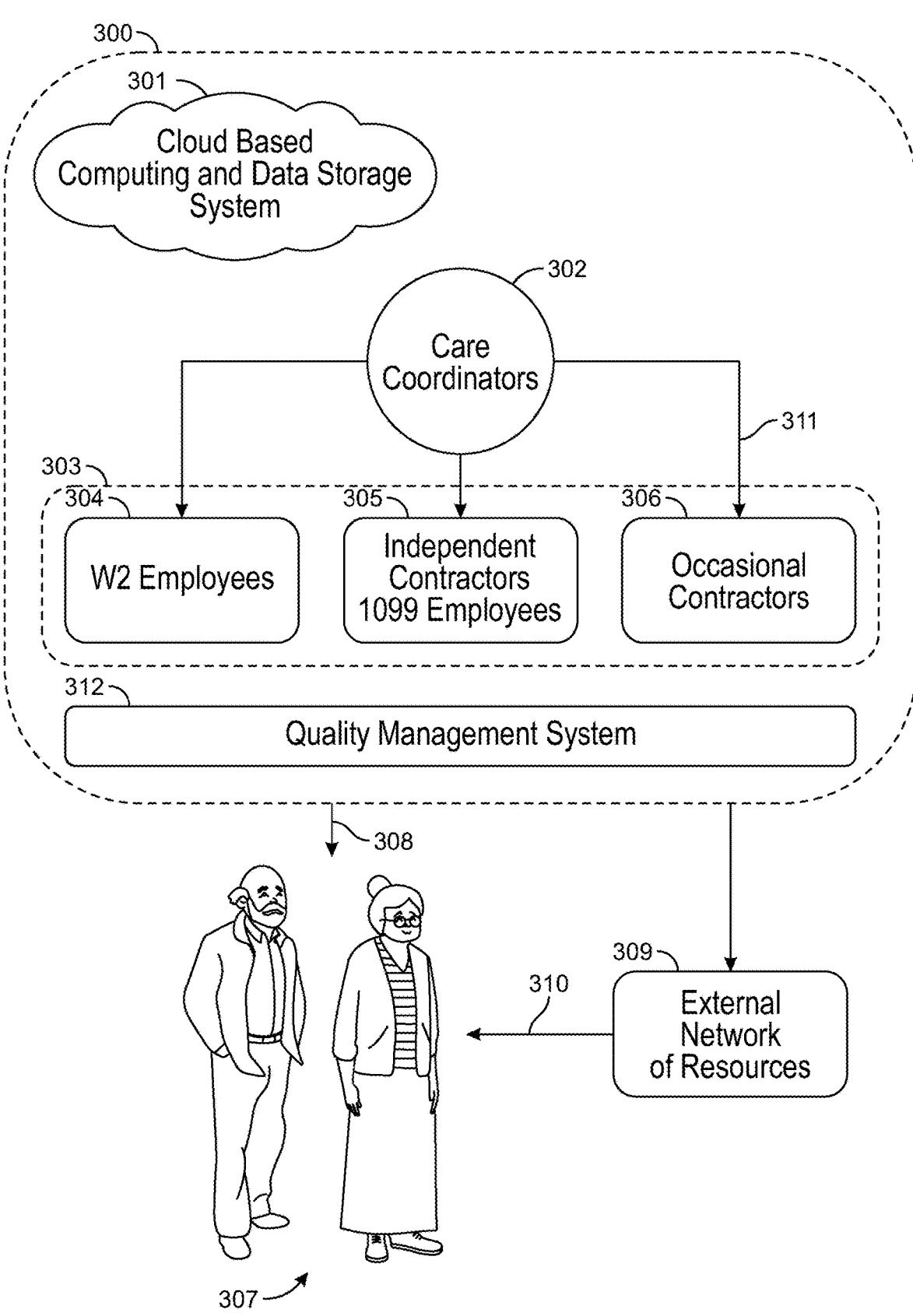
FIG. 3 is a representation of one embodiment of organization of the orchestration server in the context of extended care management.

Although most communities have at least some of the elements, few communities have all the elements. Many end nodes have limited knowledge of available resources, often there is poor coordination of resources and unclear mechanisms to provide (and pay) for resources to those who need them. In this disclosure, an orchestration server ("OS") 108 is configured to coordinate delivery of resources to provide ERO and TRO. The OS 108 can provide some resources directly (e.g., telephone follow-up of an end node) and can initiate and coordinate the provision of resources from the community elements or the RMS. The organization of the OS 108 is illustrated in FIG. 3, described below in detail. In summary, the OS 108 can include an organization of people who coordinate the provision of resources.

The OS 108 interacts and communicates 109 with the RMS. For example, the RMS 102 can request or contract with the OS 108 to provide ERO or TRO resources to the end node(s) (e.g., patients, user entity, subscriber, managed entity, network participant, service consumer, and/or any endpoint device). The OS 108 can provide information back to the RMS 102 about end node outcomes, arrange scheduling, and provide information about the healthcare of the end node outside the RMS 102 (e.g., in another remote site while traveling). The OS 108 can interact with the EMR 110 to take data about the end nodes, or to update the EMR (and/or other databases 111) with end node outcomes and history of resources provided.

Figure 2:
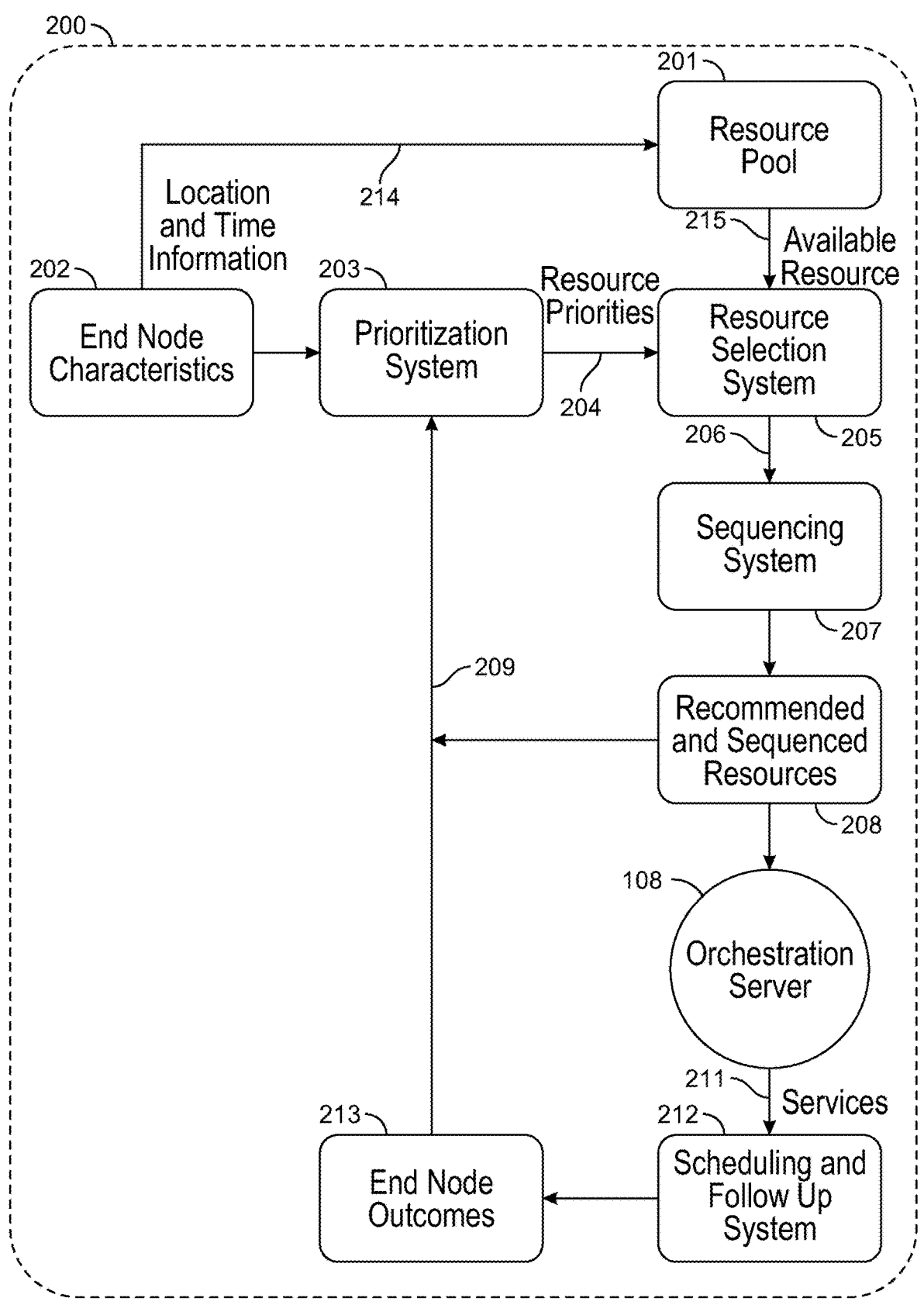
FIG. 2 illustrates a block diagram of a system and method to implement the present disclosure.

In this disclosure, the system 200 can be organized to provide ERO and TRO as illustrated in the block diagram in FIG. 2. The system 200 (e.g., the system 150 in FIG. 1A) can include similar features and functionalities as described herein with reference to at least FIG. 1A and FIG. 1B. A resource pool 201 is provided. In some embodiments, the resource pool 201 includes at least some of the resources described above and illustrated in FIG. 1A and FIG. 1B, which generally fit into the categories of clinical resources and social resources. Clinical resources can include in-home visits by an HCP; telephone consultation with an HCP; counseling; scheduling remote site or clinic visits; drug delivery to the home; and other resources. Social resources can include arranging transportation (e.g., for a clinic visit); language and translation resources; in-home food delivery; family education; referral to a social worker; and others. As time goes on, additional resources can be added to the resource pool 201, or obsolete resources can be removed from the menu. In this manner, the resource pool 201 can be continually updated to reflect the best possibilities.

At least one (e.g., each) element in the resource pool 201 is tagged to reflect geographical and time availability. Thus, the available resources 215 can be different for at least one (e.g., each) end node and for different times of day. For example, some end nodes can be in an area in which social workers are not available and/or unavailable, so social workers can be excluded in the resources available for that end node.

End node characteristics can include clinical characteristics such as diagnosis, duration of current clinical condition, prior treatments, medications, comorbidities (e.g., diabetes, obesity, hypertension), history, physical characteristics (e.g., height, weight, age, BMI), and vital signs. Many of these clinical characteristics can be obtained from the remote site end node records (e.g., hospital patient records and/or data) either automatically (e.g., computer-to-computer interface for the EMR), manual entry, and/or some combination. End node characteristics can also include social characteristics such as marital status, ethnicity, employment status, family support, languages spoken, access to transportation, analysis of family or community support systems, access to nutrition, and/or income level. End node characteristics can also include annotations from service nodes such as clinicians, providers, nurses, and/or medical assistants. The EMR may not the sole source of information on the needs of end nodes. The disclosure described herein incorporates the ability to retrieve data from other databases 111 with which it interfaces. Examples of such databases include employment, social resources,, home nursing care program, family members, or other external entity engaged in elements of care delivery for the end node. Some of the characteristics of the end node can need to be entered manually. End node characteristics can include categorical variables (e.g., sex) and continuous variables (e.g., height). End node characteristics can also include derivative variables e.g., whether or not the blood glucose of the end node is within or outside the normal range for that end node.

System 150 (FIG. 1A) can include interfaces, data collectors, and/or processing circuits configured to receive and utilize data from a broad range of sensor devices (e.g., glucose monitors, fall detection sensors, wearable biometric trackers, environmental sensors, camera, and/or any patient- or device-side telemetry source) as part of the context data of an end node. These sensors can provide continuous, periodic, and/or event-driven measurements (e.g., blood glucose readings, fall events, heart rate streams, activity measurements, location signals, and/or environmental status indicators) that can be integrated into the operational context of the end node. Incorporating real-time (or near real-time) and historical sensor data as input to the prioritization model allows system 150 to generate resource priority data and orchestration plans using high-frequency and context-specific observations, rather than relying exclusively on record-based or retrospective data. Technical improvements resulting from these sensor-based integrations can include increased granularity and relevance of context data (e.g., enriched event history, anomaly detection, and/or trend analysis), faster detection and response to status changes (e.g., instant triggering of resource allocation on detection of unsafe glucose levels, immediate dispatch of intervention following a detected fall, and/or automated updates of care plans in response to sensor trends), and/or improved feedback loops for adaptive prioritization and plan updating. By using processing circuits to process, aggregate, and/or learn from diverse streams of sensor input, system 150 can address technical limitations of traditional orchestration systems that are slow to detect context change, miss transient risks, and/or depend on infrequent manual or record-based updates. The camera can be configured with AI-based object recognition and/or scene analysis to detect specific events and/or environmental conditions relevant to the safety and well-being of the end node. For example, the camera can identify if the end node has fallen, detect the presence of a visitor, and/or recognize that a window or door has been left open, and such detections can trigger corresponding resource allocations and/or notifications within the orchestration plan.

Elements of end node characteristics are location information and time. Location can be both a permanent location (e.g., place of residence) or a current location (e.g., when working away from the home). Current location information can be provided, for example by a mobile phone which interacts with the system. As described above, location and time information 214 modifies the resource pool 201 to reflect local availability so the available resources 215 for that end node at that time are one input to the resource selection system 205. Location information is also used in other ways as will be described below.

End node characteristics 202 is one set of inputs to the prioritization system 203. The prioritization system 203 can generate numerical resource priorities to the resource pool

201 to prioritize which resources should be provided. The prioritization system 203 can use a computer system (e.g., which can be local, or a cloud based computer system, and/or a distributed system) and uses one or more algorithms or, in some embodiments, an AI engine to generate the priorities.

The prioritization system 203 can generate numerical resource priorities 204 to the resource selection system 205 which can use the priorities and the resource pool 201 to select one or more resources to be provided to the end node. The resource priorities 204 can be used to prioritize resources based on analysis of the individual data of the end node from the end node characteristics 202 and other inputs (e.g., historical data, location and time). The historical data could include data aggregated from multiple end nodes that have used the system, as well as more general population statistics, and any other source of data that could be used to train an AI engine. Historical data can include data from at least one (e.g., each) individual end node. As will be appreciated, the more factors that are used in the prioritization system 203 to determine priorities to prioritize resources, the more robust the system will be to missing data.

The resource selection system 205 can use the resource priorities 204 and available resources 215 to provide recommended resources 206 which are communicated to a sequencing system 207. The sequencing system 207 can use the recommended resources and integrates with other information, such as the availability of selected resources (e.g., a clinic visit must fit in with the clinic schedule) and information about if and how sequencing of resources makes a difference to the outcome, among other factors. For example, prior information about a particular end node can show that the particular end node usually needs two reminder phone calls to attend a clinic visit, as well as arranging transportation, whereas another particular end node needs only one reminder via text message and has her own transportation, and/or another end node requires communication and integration of family members in assisting the end node with support. The resource selection system 205 and the sequencing system 207 thus work together to optimize the resources to be provided for the best outcomes at minimal cost, tailored to at least one (e.g., each) individual end node.

The recommended and sequenced resources for a particular end node 208 are communicated 209 back to the prioritization system 203 which maintains a record of resources for at least one (e.g., each) end node. The recommended and sequenced resources are also communicated to the OS 108 which coordinates the provision of resources as illustrated in FIG. 1B and described in detail with reference to FIG. 3. As the resources 211 are provided, a scheduling and follow-up system 212 keeps track of resources provided (or attempted to be provided), and end node outcomes.

In some implementations, the end node can be followed up coordinated by a scheduling and follow-up system 213. In some embodiments, at least some of the follow-up could be automatic, for example a text message with a reminder for the end node to take medications or schedule a clinic visit. In some embodiments, follow-up could be in person e.g., with a clinic visit at the discharging remote site or another service node, a telephone follow-up, or an in-home follow-up. In some embodiments, follow-up could be automatic e.g., with a home blood pressure monitor (systolic and diastolic blood pressure, and heart rate) or bathroom scales (end node weight) that connects (e.g., via Wi-Fi or the cell phone system) to automatically provide follow-up data.

The outcomes from follow-up are input to an end node Outcomes system 208 which accumulates and aggregates the follow-up data. The end node outcomes can be input to the prioritization system 203 which uses those outcome data (among others) to adjust the prioritization for the resource selection system 205. End node outcomes can be communicated 109 back to the RMS 102 in real-time (or near real-time) or occasionally (batch mode).

Information about the recommended and sequenced resources 208 is one set of inputs to the prioritization system 203. In some cases, the resources recommended cannot be provided e.g., because an end node misses a follow-up visit, so it is important that the prioritization system 203 has inputs of the resources actually provided, not just those recommended. For example, if an end node routinely misses clinic follow-up visits, the prioritization system 203 can take that into account to de-prioritize clinic follow-up visits and emphasize telephone follow-up. The information about resources actually provided is provided by the end node outcomes system 213.

In some embodiments, the prioritization system 203 incorporates AI such that the resource selection system 205 can be informed by the prior experience of a large set of end nodes, as well as the individual outcomes of at least one (e.g., each) end node. The AI system of the prioritization system 203 can incorporate multiple inputs and outputs with accuracy and time beyond the capabilities of any human or group of humans.

Figure 5:
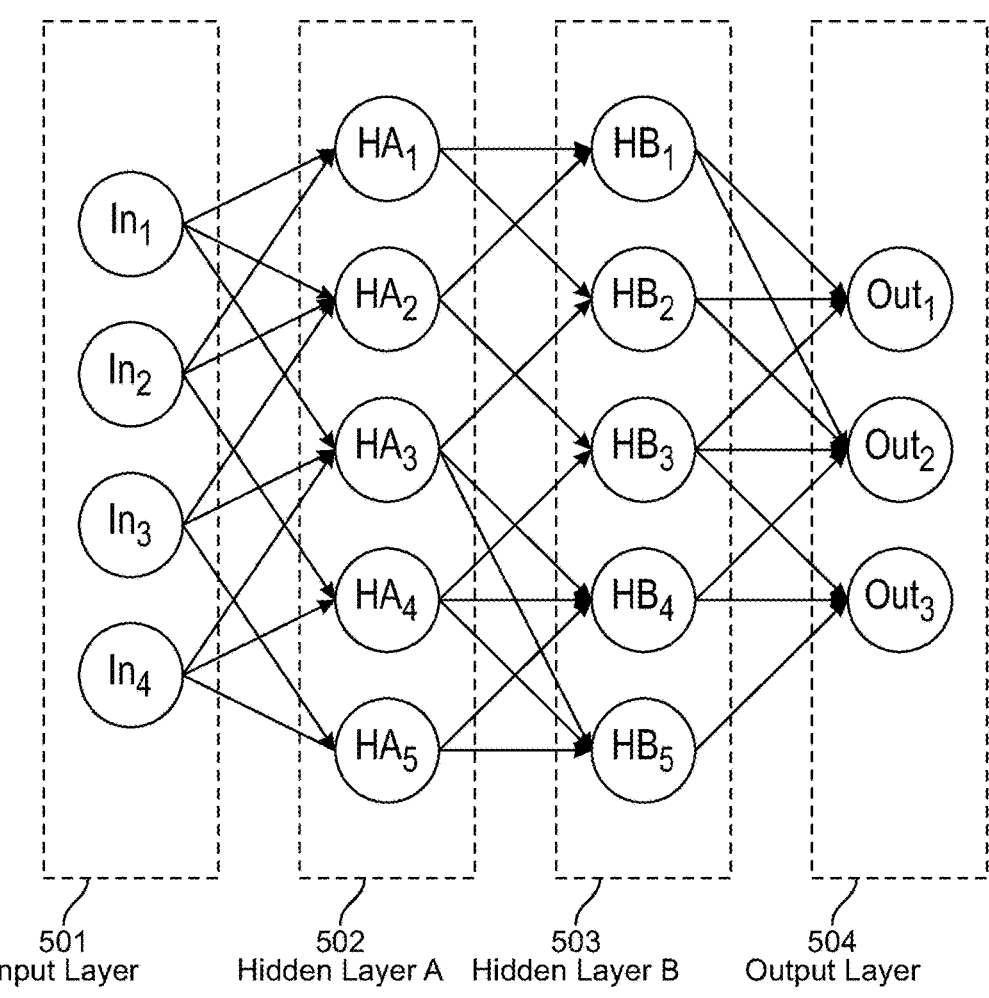
FIG. 5 illustrates an example of organization of an ANN.

An example of some embodiments of an AI based prioritization system 203 is shown in FIG. 5. Additional features and functionalities are described with reference to the modeling system 154 of FIG. 1A. A two-layer artificial neural network (ANN) can be implemented with an input layer 501, two hidden layers 502 and 503, and an output layer 504. As will be appreciated by one skilled in the art, an ANN can have any number of hidden layers, and number of inputs and outputs. The inputs to the input layer, {In1, In2, In3, In4, . . . Inn} include end node characteristics 202, end node outcomes 213, and recommended and sequenced resources 209. The outputs of the ANN {Out1, Out2, Out3, . . . Outn} are the Priorities which are the input to the Resource Selection System 205. The connections between the layers are for illustration only, and a person skilled in the art will understand that there can be more or fewer connections between the nodes in at least one (e.g., each) layer.

The intermediate outcomes in the hidden layer A 502 {HA1, HA2, HA3, HA4, . . . HAn} depend on the inputs and the weights between the inputs and the intermediate outcomes that arise from the training of the ANN. Similarly, the intermediate outcomes in the hidden layer B 503 {HB1, HB2, HB3, HB4, HB5, . . . HBn} depend on the intermediate outcomes in Hidden Layer A and the weights between them that arise from the training of the ANN. Finally, the Outputs {Out1, Out2, Out3, . . . Outn} depend on the intermediate outcomes in Layer B and the weights that arise from the training of the ANN.

In some implementations, the ANN uses uplift modelling, a technique to model the change in probability of an outcome resulting from an action. In an embodiment for TRO, the initial probability of remote site readmission is calculated based on the end node characteristics. Then one or more interventions (resources) are applied, and the readmission probability is recalculated. In an iterative process, different interventions are added (or subtracted), and the ANN settles on the interventions which minimizes the probability of readmission.

In this embodiment, the inputs {In1, In2, In3, In4, . . . Inn} include end node characteristics end node outcomes, available resources, cost of resources, and location information. The outputs {Out1, Out2, Out3, . . . Outn} can be the priorities of intervention—e.g., weights to the resource selection system 205 with the resource that has the highest impact on reducing risk of readmission having the highest weight.

The outputs can also include the relative timing of intervention—that is, weighting often does not account for the sequence of interventions. For example, ordering transportation cannot be done until a follow up visit is scheduled and confirmed. The outputs can also include an estimate of the cost effectiveness of intervention which can be used as another input to prioritize resources. For example, certain drugs to treat diabetes are relatively new and expensive, whereas there can be inexpensive generic drugs with similar clinical performance.

In some implementations, the ANN can be initially trained using medical records (e.g., obtained from an EMR). The records can be curated (e.g., to ensure complete data without obvious errors). For example, the ANN can be initially trained on previous instances of input data (e.g., a data set associated with an individual end node) and can be adapted to learn when data has been corrected (which can require further reference to a curated input data set). As one example, an input data set can include the following inputs, which would be indicative of obvious errors that can have been corrected later: e.g., combination of Sex=Male, Date of Last Menstruation=30 Days Prior is not possible; Age=9, Number of Children=2 is not possible. In some implementations, or in addition, the input data set can include more subtle errors such as inconsistent biomarker data, which the ANN can learn to recognize. Accordingly, the AI system (e.g., the modeling system 154 of FIG. 1A) can be adapted to provide ongoing and substantially real-time error-checking of input data on a large scale in a manner that could not be manually performed by a human due to the enormous amount of data involved in executing the disclosed systems and methods at scale with respect to ERO, TRO, or other resource orchestration environments. Training methods for the ANN can include supervised learning in which the curated data from the EMR is used. The ANN can be trained using back propagation, in which the input data are derived from the EMR and other databases, the interventions which produce results are compared to the output of the ANN, and the weightings for intermediate nodes can be adjusted to minimize and/or reduce error between the observed results and the outputs.

In some implementations, the training dataset can be obtained from multiple examples of end node data in the EMR from one or more RMS. A curated training dataset will use end node characteristics (as described above), interventions, and end node outcomes (among others) to train the AI system. In some embodiments, the AI system will be continuously self-improving using data derived from new end nodes. In some implementations, the prioritization system 203 can operate with sparse data (e.g., less than complete data in the input layer 501) such that the resources selected are the "best estimate" based on the data available.

Still referring to FIG. 5, the modeling system 154 and the model(s) 155 can address technical challenges present in prior network resource orchestration systems that apply manually defined weights and static selection logic to resource prioritization. Prior implementations often employ conditional statements and/or linear ranking functions to assign resources based on limited combinations of input features. Such architectures can result in a failure to resolve conflicts among available resources when the number of candidate resources exceeds the number of allocation slots and/or when the resource pool 201 exhibits overlapping skill sets, time windows, and/or capabilities. Additionally, hardware limitations in legacy systems can constrain throughput when processing real-time (or near real-time) data updates and/or high-dimensional context vectors, resulting in delays when multiple end nodes request simultaneous allocations. Previous systems can often require frequent manual intervention to adjust ranking criteria and/or to correct output errors caused by unmodeled dependencies among context features.

The modeling system 154 improves over the technical limitations by integrating at least one AI model (e.g., the model(s) 155) configured as a multi-layer neural network, transformer-based model, and/or machine learning inference engine. The system 154 can process feature vectors that encode current and/or historical end node context data and/or metadata describing resource status, availability, and/or operational constraints. By applying the model(s) 155 to the input features, the modeling system 154 can generate a consistent array of resource priority values, with at least one (e.g., each) value quantitatively representing an assigned priority for a corresponding network-accessible resource. The modeling system 154 can implement regularization techniques and/or distributed processing frameworks. This allows the system 150 to handle incomplete, sparse, and/or noisy input data, and/or to adapt the priority algorithm as new training examples become available, thereby improving throughput and reducing the occurrence of allocation deadlocks in dynamic environments. Processing circuits of the modeling system 154 can execute inference operations in parallel across batches of end nodes, further improving system scalability and response time. The modeling system 154 can support automated, real-time (or near real-time) orchestration planning for resource assignments in settings with variable operational conditions. For example, the use of the model(s) 155 to compute priority score arrays for at least one (e.g., each) assignment cycle allows the modeling system 154 to generate resource orchestration plans that reflect both current end node needs and/or projected availability of resources. This reduces manual rescheduling and/or intervention by network operators.

Additionally, the modeling system 154 can apply the model(s) 155 structured as a multi-layer neural network as depicted in FIG. 5. The input layer 501 of the model(s) 155 can receive as input a plurality of data features, including context data corresponding to at least one end node and resource data corresponding to at least one network-accessible resource. The features provided to the input layer 501 can include continuous variables, such as numerical values for availability, cost, and location, and/or categorical variables representing resource type or end node classification. The input layer 501 can map each input feature to a corresponding node, generating activation values that are forwarded to at least one subsequent hidden layer.

The hidden layers 502 and 503 of the model(s) 155 can process the activations from the input layer 501 by applying learned weight matrices, non-linear transformation functions, normalization, and regularization operations. At least one (e.g., each) node in the hidden layers 502 and 503 can compute intermediate activation values as weighted combinations of the input activations it receives and can apply activation functions, such as rectified linear unit (ReLU) or hyperbolic tangent, to produce non-linear feature representations. The use of multiple hidden layers in FIG. 5 allows the modeling system 154 to encode higher-order feature interactions, such as combining end node state and resource availability with observed historical outcomes, which enhances accuracy of priority assignment in environments containing complex, high-dimensional data. Processing circuits of the modeling system 154 can execute each transformation in sequence, forwarding the computed activations between layers as described in FIG. 5.

The output layer 504 of the model(s) 155 can compute a vector of resource priority values based on the activations received from the last hidden layer 503. At least one (e.g., each) output node in layer 504 can correspond to a network-accessible resource, and the model(s) 155 can generate, for at least one (e.g., each) resource, a numerical priority score. The scores can be normalized to a predefined range, such as from 0 to 1, supporting consistent comparison and selection in downstream orchestration planning. The modeling system 154 can transmit the set of priority scores from the output layer 504 to components responsible for final resource selection and scheduling. By incorporating the modular structure of the neural network (as illustrated in input layer 501, hidden layers 502/503, and output layer 504), the modeling system 154 can support self-adjusting, data-driven prioritization for a variety of resource orchestration scenarios, improving system throughput, allocation quality, and/or automation as compared to systems not utilizing the structure disclosed in FIG. 5.

Figure 6:
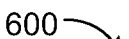
FIG. 6 illustrates an example of prioritized selection from a resource pool.

FIG. 6 shows an example 600 of the operation of the resource selection system 205. The resource pool 201 provided to the resource selection system 205 can be tagged with a modifier that reflects the availability of the resource based, for example, on location or time (e.g., a social worker can be available only on some days, whereas a telephone follow up is available 24/7). In this example, the modifier is one if the resource is available, and zero if it is not. The resource priorities 204 from the prioritization system 203 are modified by the availability of resources to generate a score of recommended resources 206 to the sequencing system 207. In this example, the recommended and sequenced resources (ranked high to low) are daily reminder, telephone follow up, clinic visit, medication delivery, transportation and food.

As shown in FIG. 2, this list is provided to the orchestration server 108 which can coordinate the provisioning of resources. For example, the OS 108 care coordinator can call the clinic to schedule a visit, arrange transportation for the client, initiate a daily reminder (e.g., via mobile phone), call the pharmacy to order medication delivery, and then call the client to advise what action has been taken, notify of the date of the clinic visit and that transportation has been arranged and ask if food delivery is needed.

In one example, the end node suffers from advanced heart failure (HF). Following remote site discharge, the resource selection system 205 recommends daily telephone follow-up by a medical assistant for the first week, followed by weekly follow-up thereafter. In addition, an automatic message is delivered to the user device (e.g., phone, mobile device) of the end node to remind the end node to take the prescribed medications at the same time every day. The message could be delivered via text message (e.g., SMS, WhatsApp), by automated voice message, or personal contact with the care coordinator. In addition, based on the social situation of the end node, in-home food delivery can be scheduled automatically for every evening. In addition, the end node is provided with a "smart" bathroom scale that communicates with the end node outcomes system 213, and the end node is reminded to weigh himself at the same time every day e.g., upon waking in the morning. In addition, the end node has a questionnaire pushed to his mobile phone to ask questions about his symptoms. After one week, the system records that the weight of the end node is increasing, and he reports shortness of breath. Based on these new data points, the prioritization system 203 adjusts the resources recommended and for example can recommend an in-home visit by a healthcare professional, medication adjustments, clinic visit, and/or alteration of exercise regime.

FIG. 3 is a representation of some implementations of the organization of a system 300. The system 300 (e.g., the OS 108 in FIG. 1A and FIG. 1B) can include similar features and functionalities as described herein with reference to at least FIG. 1A and FIG. 1B. The system 300 coordinates the provision of resources 308 to the end node 307 from the OS. In some cases, the OS 108 cannot have the resources to provide certain resources, and they can be provided by an external network of resources 309 to the end node 310. For example, if one of the prioritized resources is telephone counseling in the first language of the end node, then the OS 108 can employ telephone counselors fluent in that language from the external network of resources 309. If one of the required resources is transportation for clinical follow-up visits, then the OS 108 can arrange transportation resources as needed. In some embodiments, the system 300 establishes contracts with the external network of resources to predetermine availability, pricing, and/or quality.

In some embodiments, the system 300 can be implemented on a cloud-based computing and data storage system shown as a cloud based computing and data storage system 301. Cloud-based resources allow access to the system from virtually anywhere, at any time (e.g., from a desktop computer or a smartphone app) offering flexibility for service nodes to monitor the progress of any end node regardless of the location of the end node. The cloud database can be updated in real-time as new data become available. Local computing and storage can also be used as necessary for example personal computers, tablets, and/or smart phones. In some embodiments, the computing and storage system could be proprietary and local to the OS, with remote access, or some combination of local and cloud based.

The OS 108 can be used to facilitate the care coordinators 302. The care coordinators are like the "traffic cops" of the system and are used to coordinate internal and outsourced resources and provide certain resources themselves. The care coordinators coordinate care through a network of care service nodes 303. The care coordinators can be co-located in a central office or can work remotely. The care service nodes 303 can be full-time or part-time, and made up of a combination of at least one of the group of direct employees 304 (so-called "W2 employees" because they are on payroll), contract employees 305 (so-called "1099 employees" because they are treated as independent contractors), and occasional contractors 306 who can bid on jobs from time to time (e.g., the so-called "gig economy"). Care coordinators can be trained as medical assistants, nurse, or similar allied health professionals.

All operations of the OS 108 are underpinned by a Quality Management System (QMS) 312. The QMS specifies procedures, practices, and training (e.g., among other things) to ensure the quality of delivered resources. For example, at least one (e.g., each) of the W2 employees 304, 1099 employees 305 and occasional contractors 306 are required to undergo rigorous training and assessment by the OS 108 before being allowed to provide resources (e.g., a process commonly referred to as "onboarding"). Refresher training and assessment is provided from time to time. The QMS 312 can also impose certain quality standards on the external Network of Resources. For example, the contract between the OS 108 and an external transportation company can require that the transportation must be available within 30 minutes of ordering, or the service node will risk a financial penalty. When the system 300 (e.g., such as the OS 108 in FIG. 1A and FIG. 1B) is presented with the recommended and sequenced resources 208 from the resource selection system 205 via the sequencing system 207, the care coordinator 302 assigned to that end node orders those resources to be provided by at least one of the employee care service nodes 304 or 305.

If the care coordinator 302 determines that the required resources are not within the range of expertise and available personnel, then the OS 108 will communicate a resource request 311 to its network of occasional contractors 306 who are invited to bid to provide the requested resources. One or more of the occasional contractors can offer to provide the requested resources, and the care coordinator accepts at least one of the offers. Once the care coordinator knows the requested resources can be provided, that availability is then communicated to the scheduling and follow-up system 213. In some embodiments, the process of invitation to bid and acceptance of a bid is automated via the cloud computing platform, which unburdens the care coordinators and frees them up to provide more resources.

Figure 4:
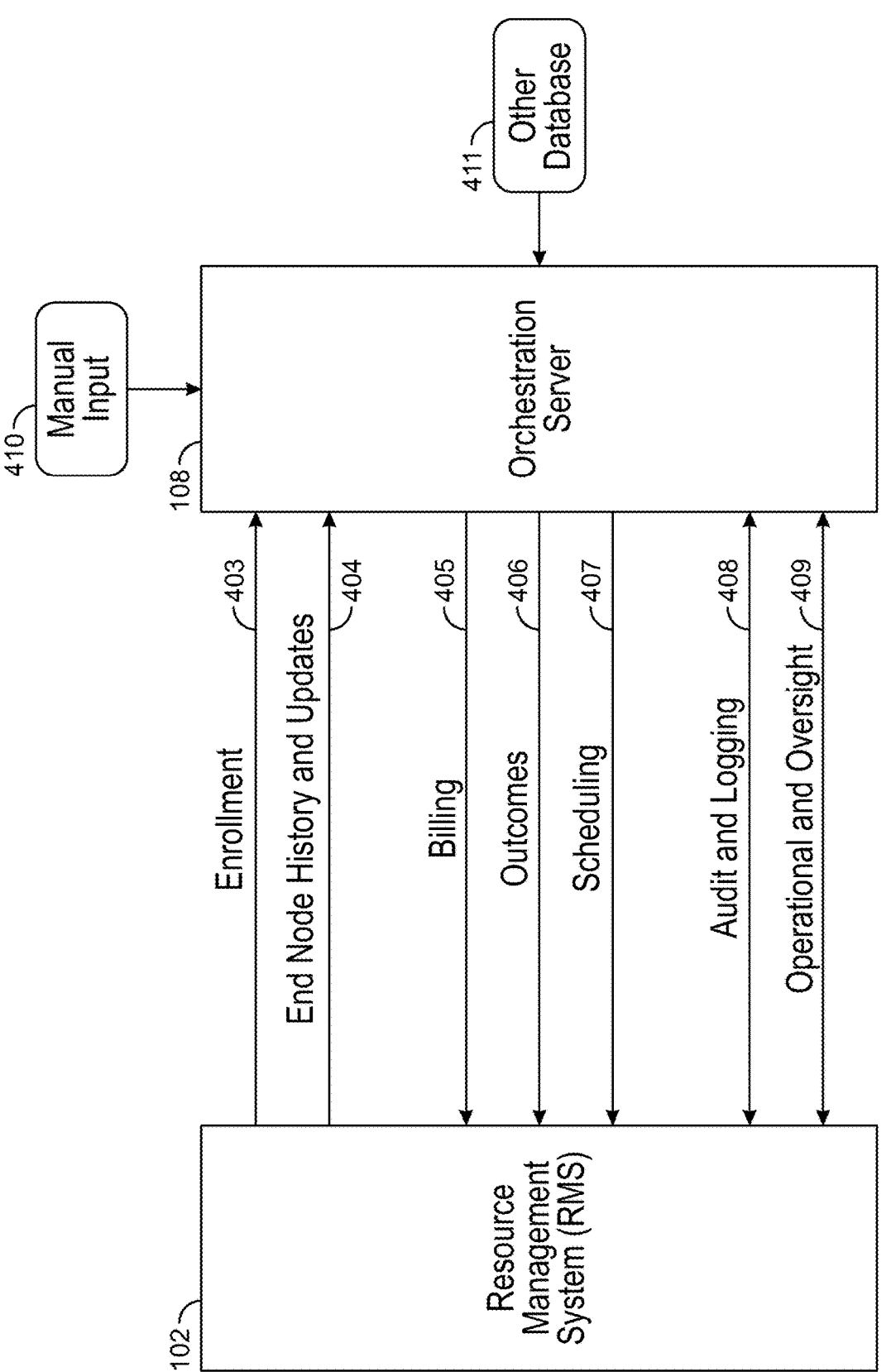
FIG. 4 illustrates a representation of data flows between the service node and the orchestration server.

FIG. 4 is a representation in some implementations of the data flows between the RMS 102 and the OS 108. The HCP could be a remote site (or network of remote sites), a clinic, a resource management system and payer, a network of physicians, a community-based healthcare resources organization, or a company that provides its own healthcare resources. The OS 108 is the organization that provides and manages the system of the present disclosure. In some implementations, the RMS 102 initiates the communication by providing end node enrollment data 403 to the OS 108. In some implementations, the OS 108 can engage with multiple HCPs to sell its resources. Once the enrollment is accepted by both parties and the end node, the RMS 102 sends end node history data 404 to the OS 108. As resources are provided and the end node re-engages with the HCP, updates to the end node history are communicated to the OS. Once the OS 108 engages with the end node and initiates ERO resources, the OS 108 communicates billing information 405 to the HCP (e.g., to get paid for its provision of resources), outcomes data 406, and scheduling information 407 (e.g., for follow-up clinic visits). At least one (e.g., each) of the HCP and the OS 108 will have an underlying Quality Management System (QMS) which requires the exchange of audit and logging information 408. The HCP is responsible for the healthcare of the end node (e.g., the OS 108 provides resources but does not take clinical responsibility), and thus there is an exchange of operational and oversight data 409 between the parties. Once end node history and other information is communicated from the HCP to the OS, the OS 108 can flag missing data. In that case, manual input 410 can be needed or helpful to augment the data obtained from the HCP. The system can communicate information from other databases 411, for example from a social resources service node. The system will consolidate all the information available into end node characteristics 202 as input to the prioritization system 203.

As will be apparent to those skilled in the art, there will be multiple layers of data communication between the parties. The FIGS. provided are a representation of one embodiment, and other implementations are possible with additional or alternative data communication.

The description herein describes an ERO and TRO system, with one of the purposes to reduce remote site readmission. However, the system is not limited to dealing with end nodes after discharge from remote site. The system can be used for "remote site at home" (or hospital at home) or long-term enhanced care of chronic end nodes. In some implementations, the system is used to provide enhanced resource orchestration for indigent people who can normally be eligible for a Medicaid resources state. Such end nodes are notoriously difficult to manage, for example the end node can be homeless or itinerant. The system can be used to improve the long-term health of this type of end node, thereby reducing the burden on a resource management system of a state. The system can also be used to support remote sites in the care of end nodes with "remote site at home" care delivery. Furthermore, the system can provide information that allows the state to better deliver healthcare resources to its population at optimal cost.

In an alternative embodiment, the output of the resource selection system 205 can be reviewed by one or more persons (e.g., physicians or medical assistants) who can override or re-order the selected resources for the end node. For example, a physician familiar with the end node can be aware that the end node has an adversarial relationship with nearby family members and can therefore de-emphasize family education in the selected resources. Any such reorder or override will be recorded and incorporated in the prioritization system 203. In some embodiments, the system can determine the risk of remote site readmission prior to intervention, and then use the recommended resources and historical knowledge to determine the risk (probability) of remote site readmission after provision of the resources. For example, a Bayesian statistical approach can use a priori probability of readmission, modified by interventions to yield an updated probability of readmission.

The updated probability can be used in an iterative process to adjust the recommended resources. In an example, the a priori probability of 30-day readmission is 30% for an end node, and with the suggested interventions it falls to 20%. The target is 10%, so in an iterative manner, the prioritization system 203 and resource selection system 205 can add resources until the post-intervention probability of readmission reaches 10%. Similarly, the prioritization system 203 can automatically test if resources make no difference to the updated probability of readmission, and not include those resources in the recommended and sequenced resources, thereby reducing useless time, cost, and effort. This iterative process can be used in a business pricing model. For example, many end nodes for whom this system and method is suitable are those covered by a value-based reimbursement system in which the HCP is paid a fixed fee per enrolled end node per month (PEPM). Medicare Advantage and Medicaid are examples of a value-based reimbursement approach.

In a real-world situation, the OS 108 must also be financially viable. With a value-based reimbursement system and a fixed fee PEPM, the OS 108 needs to be careful that the financial risk is not transferred to the OS 108 from the RMS 102. In some implementations, prior to accepting enrollment of an end node, the OS 108 will evaluate the a priori risk (probability) of remote site readmission, the post-intervention risk (probability) of remote site readmission, and the anticipated cost of providing the resources. If the cost exceeds the PEPM fee for that end node, the OS 108 can decide to reject the enrollment of that end node. The OS 108 has access to large amounts of data on at least one (e.g., each) end node and the population of end nodes. Those data have intrinsic value, and access can be sold or rented for example to government organizations responsible for making policy.

The OS 108 has access to data from at least one (e.g., each) end node, some of it in real-time or near real-time. That data can be used to generate an alarm. For example, a diabetic end node can regularly travel between home and work and have a follow up telephone call every few days. On one occasion, the call is not answered. The care coordinator initiates a database query and learns that the end node has not been to work for the last few days, and the telephone of the end node has not moved for two days (e.g., according to the GPS tracking). The care coordinator immediately calls a neighbor (registered as one of the available resources) to knock on the door of the end node. When the neighbor reports the knock is not answered, the Care coordinator initiates a call to emergency resources who arrive and find the end node immobile on his bed in hypoglycemic shock. Intravenous glucagon is administered, and the end node recovers without further incident. In this example, had the end node not been treated as quickly, a repeat remote site hospitalization could have been needed.

Figure 7:
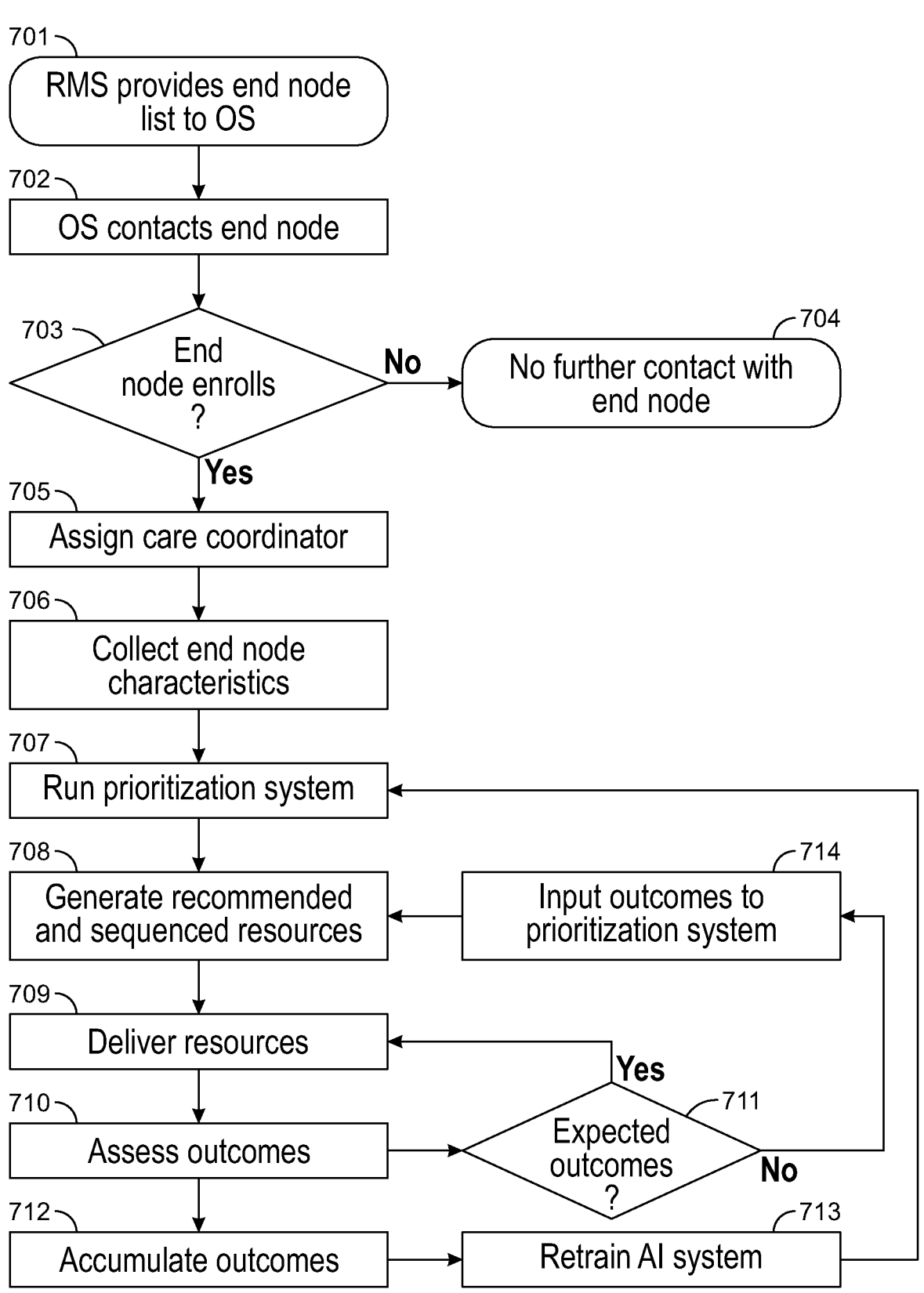
FIG. 7 illustrates the flowchart of activities for an end node.

An example of the method with an end node is illustrated in FIG. 7. Before the process starts, the RMS contracts with the OS 108 to set a price for the OS 108 to provide the resources. This is usually based on a fixed fee Per Enrolled Person Per Month ("PEPM"). The contract is usually for a fixed period of time e.g., annually. In another embodiment, the OS 108 can use risk-based pricing to the RMS and accept lower-risk end nodes at a lower fee, thus enabling all parties to optimize their financial position (profit).

The process begins with an RMS providing a list of potential end nodes to the OS (block 701). That is, at block 701 the processing circuits (e.g., the modeling system 154 of FIG. 1A) can receive, from the RMS, data including a plurality of candidate end node records and/or identifiers for evaluation and enrollment. For example, the processing circuits can retrieve a structured list of end node identifiers from a remote database and store the identifiers in local memory for further processing. At block 702, the processing circuits can preprocess the list by filtering, de-duplicating, and/or validating each candidate end node entry against eligibility parameters and/or existing enrollment records. That is, at block 702 the processing circuits can compare the candidate end node data to one or more contract terms, remove expired or duplicate entries, and/or flag records lacking required attributes. For example, the processing circuits can query for active status and/or complete a data integrity check for each received end node identifier. The OS can then contact (block 703) at least one (e.g., each) potential end node to invite the end node to enroll in the resource. Not all end nodes can choose to be enrolled, and the OS can not wish to enroll some end nodes (e.g., those with so many health problems that the OS can struggle to provide the resources needed). That is, at block 703 the processing circuits can transmit an enrollment invitation and/or notification to the communication address associated with each eligible end node and/or route enrollment tasks to an external partner for outreach. For example, the processing circuits can send batch email invitations, initiate SMS notifications, and/or generate an assignment to an enrollment assistance agency. The OS can use an external organization to help enroll end nodes. End nodes who decline enrollment (block 704) will not be contacted again for the duration of the current contract. That is, at block 704 the processing circuits can record denial responses and/or update a contract status field for each declining end node to indicate ineligibility for future contact until initiation of a new contract cycle. For example, the processing circuits can update a system database to set a "do not contact" flag and/or log the time and reason for the declined enrollment.

End nodes who decline enrollment who are still managed by the RMS can serve as a "control group" for comparing outcomes with and without the resources ERO and TRO provided by the OS. End nodes who decline enrollment can be eligible for enrollment in the next contract cycle, and can be contacted again by the OS. Once an end node is enrolled, the OS assigns a care coordinator to that end node (block 705). That is, at block 705 the processing circuits can assign a care coordinator identifier and/or generate an assignment record linking the enrolled end node to the assigned coordinator. For example, the processing circuits can select a care coordinator from a resource pool, update an assignment database, and/or transmit an assignment notification to a care coordinator system. In some implementations, when health outcome data is available for non-enrolled end nodes, the processing circuits can compare outcomes between enrolled and non-enrolled populations to quantify the impact of the orchestration platform. In some implementations, the results of such comparative analyses can be used to demonstrate value and support negotiation of improved pricing or reimbursement terms with resource management systems or payors.

The end node characteristics are collected (block 706) (e.g., from the EMR and other sources). That is, at block 706 the processing circuits can retrieve, aggregate, and/or synchronize clinical and social characteristic data from at least one electronic medical record system, external database, and/or service node input. For example, the processing circuits can issue a secure query to an EMR server and/or receive demographic, clinical, and/or social data as structured data input. The end node characteristics are used as the input to the prioritization system 203 (block 707) as described above and illustrated in FIG. 2. That is, at block 707 the processing circuits can generate a feature vector, transmit the feature vector to the prioritization system 203 (e.g., the modeling system 154 of FIG. 1A) as model input, and/or cache the feature data for orchestration workflow steps. For example, the processing circuits can normalize received end node characteristics and append them to a queue for review by a resource prioritization module. From that, the prioritization system 203 can generate the recommended and sequenced resources (block 708) which are then delivered (block 709), as organized by the care coordinator. That is, at block 708 the processing circuits can process the input feature vector, produce a list of recommended and sequenced resources, and/or store a resource assignment plan for the given end node. For example, the processing circuits can output a ranked list of candidate resources, allocate scheduling timestamps, and save the assignment plan to persistent memory. That is, at block 709 the processing circuits can initiate transmission of resource notifications, activate service orders, and/or issue status update requests to assigned service nodes and/or care coordinators. For example, the processing circuits can push fulfillment commands to external scheduling systems and/or receive confirmation responses from at least one service node.

Outcomes are assessed (block 710) from time to time (e.g., on a regular follow up schedule), in conjunction with an end node contact (e.g., clinic visit) or triggered by an unscheduled event (e.g., remote site admission). That is, at block 710 the processing circuits can receive, aggregate, and/or log outcome data from follow-up contacts, scheduled appointments, and/or event-based system triggers. For example, the processing circuits can record blood pressure, weight, or attendance at a scheduled clinic visit in a data store. Those outcomes can be assessed (block 711). That is, at block 711 the processing circuits can compare the recorded outcome data to predefined thresholds or expected values and/or apply logic to identify deviations from the expected result. For example, the processing circuits can evaluate if a reported blood pressure is below or above 140/90 mmHg, or compare weight change against a 5% relative baseline. If the outcomes are as expected (e.g., weight or blood pressure reported as normal during a follow-up visit), then the resources continue to be delivered. If the outcomes are not as expected (e.g., weight gain, high blood pressure) then those unexpected outcomes are fed back (block 714) to the prioritization system 203 which can then generate different recommended and sequenced resources (block 708). That is, at block 714 the processing circuits can transmit deviation data to the prioritization system 203 and/or initiate a recalculation of the resource assignment plan in response to the previously recorded outcome data. For example, the processing circuits can push updated outcome values to the input queue of the resource prioritization module to trigger a new round of prioritized resource recommendations.

In some implementations, over time, outcomes are accumulated (block 712) from many end nodes. That is, at block 712 the processing circuits can aggregate and store outcome records from a plurality of end nodes in a centralized or distributed outcome repository. For example, the processing circuits can update a database table with a timestamped outcome entry for each resource fulfillment event. Those accumulated outcomes can be used to retrain the AI system (block 713) which improves the prioritization system 203. That is, at block 713 the processing circuits can select aggregated outcome records as training data, initiate execution of a model retraining process, and/or update the model parameters of the prioritization system 203 using the outcome data as feedback. For example, the processing circuits can launch a training routine for a neural network model, input the accumulated outcome records, and save updated weights and/or biases to system storage for subsequent inference.

In networked resource orchestration environments, repeated assignment of the same end node to remote sites within a short period can be a technical problem. When processing circuits of a resource management system execute a discharge operation for an end node without coordinating subsequent assignments, the end node can remain at risk of requiring additional remote site resources, frequently within thirty days. Failure to execute timely and context-aware follow-up assignments for the end node can increase the incidence of repeat requests, resulting in strain on available resources, increased operational load on the orchestration server, and greater total allocation of network bandwidth and compute cycles. Evidence from large-scale resource networks-including nearly 20% of enrolled end nodes experiencing repeat assignments within a 30-day interval as described in Beauvais, Bradley, et al. ("Is the Hospital Value-Based Purchasing Program Associated with Reduced Hospital Readmissions?" Journal of Multidisciplinary Healthcare (2022): 1089-1099)—demonstrates the technical and economic impact of this problem.

Data collected by the Agency for Healthcare Research and Quality, as summarized in Weiss AJ (IBM Watson Health), Jiang HJ (AHRQ). Overview of Clinical Conditions with Frequent and Costly Hospital Readmissions by Payer, 2018. HCUP Statistical Brief #278. July 2021. Agency for Healthcare Research and Quality, Rockville, MD, confirm these repeated remote site assignments and associated system costs affect all major resource payors and network stakeholders. This validation demonstrates that remote orchestration systems configured with limited post-discharge coordination, constrained assignment logic, and/or insufficient feedback mechanisms can contribute to recurrent resource utilization, bandwidth consumption, and degraded node outcomes.

When a network or resource orchestration system implements a fixed-fee, per-node reimbursement methodology, the cost to operate the system can be further impacted by repeated remote site assignments. Such systems often use a value-based allocation model in which a service node receives a fixed fee for managing each enrolled end node per month. When orchestration servers fail to implement dynamic reassignment and/or adaptive prioritization in the follow-up resource plan after an end node remote site assignment, excess re-admissions can result in resource overload, bandwidth exhaustion, and reduced node access to available services. Minimizing repeat remote site assignments becomes a technical challenge critical to maintaining network throughput and controlling per-end-node costs.

The Centers for Medicare and Medicaid Resources (CMS) defined the technical requirements for reducing excess remote site assignments in distributed healthcare networks by establishing the Hospital Readmissions Reduction Program (HRRP). HRRP Section 1886(q) of the Social Security Act prescribes statistical performance thresholds and protocol requirements for orchestrating allocation of remote site resources to nodes that have been assigned for Acute Myocardial Infarction ("AMI"), Chronic Obstructive Pulmonary Disease ("COPD"), Heart Failure ("HF"), Pneumonia, Coronary Artery Bypass Graft ("CABG") surgery, and/or Elective Primary Total Hip and/or Knee Arthroplasty ("THA" and/or "TKA").

Technical audits published by CMS show that, by 2021, over 90% of acute-care remote site endpoints in the distributed network had triggered performance penalties for exceeding assigned thresholds for repeat allocations through HRRP criteria. Existing resource orchestration logic has not resolved the frequency of repeat events or the technical overhead on system infrastructure. Further, Zuckerman, Rachael B., et al. ("Readmissions, observation, and the remote site readmissions reduction program." New England Journal of Medicine 374.16 (2016): 1543-1551) report that even with protocol-based resource allocation, the repeat assignment rate only declined from 21.5% to 17.8% for targeted endpoints. This reduction is not sufficient to create a sustained decrease in bandwidth consumption or resource pool costs, indicating the need for a more dynamic and context-aware orchestration approach.

In addition to repeat remote site assignments, prevention of initial assignment for end nodes with chronic operational conditions also presents a technical concern. When processing circuits of a resource management system do not assign targeted monitoring, proactive resource delivery, or tailored communications to chronic-condition end nodes (such as those flagged for network tags corresponding to high resource need), the risk of requiring a remote site allocation increases, placing additional load on network infrastructure and associated resource nodes. Deployment of proactive, context-driven orchestration logic can reduce total system workload, avoid cascades of resource request events, and improve allocation of remote and in-home resources for end nodes.

Another technical concern in network resource orchestration is the allocation of resources for maternal care events. According to Maternal Mortality and Maternity Care in the United States Compared to 10 Other Developed Countries (Commonwealth Fund, November 2020, https://doi.org/ 10.26099/411v-9255), the United States exhibits a maternal mortality rate approximately twice that of comparable developed networks. End nodes flagged for pregnancy and/or postpartum care who lack access to coordinated resource assignment (e.g., networked maternity provider nodes, support resource nodes, and/or targeted notification resources) are at higher risk for adverse outcomes. Gaps in orchestration logic for providing pre-natal and post-partum resources, especially for high-need or at-risk end nodes, introduce systemic inefficiencies and can result in increased failure rates.

Technical data also indicates that resource assignment and remote site allocation efficacy are strongly influenced by social determinants of health (SDOH), such as nutrition, poverty, housing stability, transportation logistics, family support structure, and medication delivery. Many existing resource management systems and orchestration server networks do not integrate SDOH as structured context data in assignment or prioritization steps, resulting in suboptimal resource planning and increased repeat assignments. Lack of contextual awareness relating to SDOH in the orchestration data pipeline reduces efficiency in resource allocation and can increase total network-side operational costs.

Multiple technical publications describe the potential of integrating contextual social data to improve network resource allocation, but no comprehensive orchestration system is available that uses both operational and social context (such as clinical and SDOH signals) for adaptive network assignment. There is no universally accepted technical framework for incorporating SDOH context data as features for optimizing node-level resource assignment. For example, Garg et al (Garg, A., Homer, C. J., & Dworkin, P. H. (2019). Addressing social determinants of health: Challenges and opportunities in a value-based model. In Pediatrics (Vol. 143, Issue 4). American Academy of Pediatrics) identifies the need for using social context to inform decision logic, but does not describe a technical implementation to collect, aggregate, or propagate these signals through an orchestration pipeline. Similarly, reviewed technical literature in resource assignment for diabetes (Hill-Briggs, F., Adler, N. E., Berkowitz, S. A., Chin, M. H., Gary-Webb, T. L., Navas-Acien, A., Thornton, P. L., & Haire-Joshu, D. (2021). Social determinants of health and diabetes: A scientific review. In Diabetes Care (Vol. 44, Issue 1, pp. 258-279)) and for heart failure (White-Williams, C., Rossi, L. P., Bittner, V. A., Driscoll, A., Durant, R. W., Granger, B. B., Graven, L. J., Kitko, L., Newlin, K., & Shirey, M. (2020). Addressing Social Determinants of Health in the Care of End nodes with Heart Failure: A Scientific Statement from the American Heart Association. Circulation, 141(22), e841-e863) identifies contextual factors, but does not describe a system for machine-readable integration into real-time assignment decisions or prioritize resources using a scalable, networked platform.

Technical reports from the US government confirm that social contextual data such as employment, education, poverty, and housing can contribute to 50 percent or more of the operational variation among nodes in observable resource outcomes, compared to only 20 percent from direct service assignment. Whitman, A., de Lew, N., Chappel, A., Aysola, V., Zuckerman, R., & Sommers, B. D. (n.d.). Addressing Social Determinants of Health: Examples of Successful Evidence-Based Strategies and Current Federal Efforts (Whitman, Amelia, et al. "Addressing social determinants of health: Examples of successful evidence-based strategies and current federal efforts." Office Health 1 (2022): 1-30, Policy www.aspe.hhs.gov/sites/default/files/documents/e2b650cd64cf84aae8ff0fae7474af82/SDOH-Evidence-Review.pdf). Existing orchestration and assignment systems of networked resource platforms do not collect or use SDOH feature vectors as a part of prioritization and assignment, which presents a technical barrier to improving system-wide resource allocation and granularity of response to individual node queries.

In resource orchestration systems, such as those using transition resource orchestration ("TRO") and/or extended resource orchestration ("ERO"), intervention with at-risk end nodes can be performed at or after resource assignment events with the goal of reducing redundant assignments. Although TRO can demonstrate improved node outcomes, orchestration pipelines typically lack comprehensive modeling and tracking of multi-modal context vectors. Systems configured to operate with only task-level features, rather than integrating continuous context streams (e.g., dynamic SDOH, real-time social signals, or feedback from external resource nodes), can limit the technical impact of the orchestration server and/or the modeling system in multi-node environments.

For example, Finlayson, Kathleen, et al. ("Transitional care interventions reduce unplanned remote site readmissions in high-risk older adults." BMC health resources research 18 (2018): 1-9) describes reduced remote site readmission using multi-faceted interventions, but does not address orchestration logic for customizing interventions on a per-node basis using upstream feature data. Technical limitations exist when a system cannot adapt resource orchestration to specific node characteristics and/or incorporate feedback streams to inform future assignment plans.

Herberg, S., & Teuteberg, F. (2023). ("Reducing hospital admissions and transfers to long-term inpatient node care: A systematic literature review. In Health Resources Management Research (Vol. 36, Issue 1, pp. 10-24)") finds that lack of standardized orchestration processes across heterogenous node populations—particularly for rural or high-complexity environments—introduces variation in resource assignment outcomes and reduces comparability between technical systems.

Baldino, Michael, et al. ("Impact of a novel post-discharge transitions of care clinic on hospital readmissions." Journal of the National Medical Association 113.2 (2021): 133-141) reports that in-person assignment intervention processes can reduce short-term redundant assignments, but systems without protocols for continuous follow up, integration of virtual and in-person interventions, or automatic update of orchestration plans exhibit technical limitations and may undercount node outcomes due to incomplete tracking or loss to follow-up in data flows.

As demonstrated in the literature, one limitation of traditional TRO and/or ERO systems is inadequate follow-up of end nodes after assignment decisions are made in the orchestration pipeline. Existing orchestration logic does not consistently include processes for multi-site node enrollment, dynamic follow up planning, or feedback-driven modification of assignment schedule based on downstream or external data. Lack of such feedback can limit the technical effectiveness of the orchestration platform and prevent systematic improvement of allocation performance over time.

Rasmussen, Lisa Fønss, et al. ("Impact of transitional care interventions on hospital readmissions in older medical end nodes: a systematic review." BMJ open 11.1 (2021): e040057) and Kash, Bita A., et al. ("Successful hospital readmission reduction initiatives: Top five strategies to consider implementing today." Journal of Hospital Administration 7.6 (2018): 16-23) highlight collaboration between technical platforms and community nodes, as well as key follow-up and scheduling interventions, as most technically effective for reducing redundant assignments. However, existing orchestration platforms often do not implement programmatic selection, feedback, or monitoring procedures that automatically adapt resource plans for each node according to real-time context and/or outcome data.

Authors of systematic reviews confirm that existing orchestration platforms and assignment methodologies do not provide technical solutions for automated, adaptive, or data-driven selection of optimal interventions for each network node. The absence of such automation, as well as lack of detailed technical specifications for programmatic delivery, feedback integration, and impact evaluation for orchestration interventions, presents a continuing limitation for large-scale node resource assignment environments.

Recent literature indicates that while use of Artificial Neural Networks (ANN), Artificial Intelligence (AI), Machine Learning (ML), and/or Deep Learning (DL) is promising for augmenting resource orchestration systems, integration of these technologies into operational workflow for large-scale node populations is not well-documented or technically standardized.

For example, Huang, Yinan, et al. ("Application of machine learning in predicting hospital readmissions: a scoping review of the literature." BMC medical research methodology 21.1 (2021): 1-14) describes machine learning models using electronic health record data to predict redundant assignments but does not address integration of prediction outputs into live intervention selection or orchestration plan modification at the network scheduling layer.

Similarly, Liu, Wenshuo, et al. ("Predicting 30-day hospital readmissions using artificial neural networks with medical code embedding." PloS one 15.4 (2020): e0221606) finds only modest technical improvement of AI over regression for short-term prediction tasks, without describing closed-loop orchestration workflows, feedback data assimilation, or technical protocols for using model outputs to adapt resource assignment in live network operations.

Dixit (Dixit, Rohit R. "Risk Assessment for Hospital Readmissions: Insights from Machine Learning Algorithms." Sage Science Review of Applied Machine Learning 4.2 (2021): 1-15.) performed a retrospective analysis of data from 130 US remote sites for the period 1999-2008 to explore different artificial intelligence (AI) approaches for predicting remote site readmissions. The analysis demonstrates potential technical value of AI for identifying risk of repeat assignments in a distributed resource network. However, the authors acknowledged limitations of the study, specifically that exclusion of factors such as severity indicators and social context parameters (SDOH) introduces significant gaps in model accuracy and relevance. The authors did not describe a system or method for implementation of an AI resource allocation system in an operational orchestration environment, nor a process for integrating output from the AI into downstream resource assignment or follow-up actions.

Existing technical approaches for predicting risk of repeat resource assignment do not evaluate, update, or track node outcome or network performance metrics after a resource has been assigned, nor do such methods use subsequent intervention data as new input for recalculation of risk scores or priorities. Merely generating a risk prediction for a repeat assignment is insufficient to drive intervention by a resource orchestration system, and most current frameworks lack end-to-end control, feedback, and adjustment to reduce total repeat event rate or system resource consumption. There remains an unmet technical need for a system and method to determine the risk level for a repeat resource assignment following an intervention and to adjust further assignments and prioritization data based on updated risk calculations in real-time.

There remains an unmet need for a system and method for resource orchestration, including both extended resource orchestration (ERO) and transition resource orchestration (TRO), configured to minimize repeated remote site assignment events using models trained to predict node-specific risk values. Specifically, technical limitations persist where existing solutions do not integrate a comprehensive spectrum of network features, context parameters, and distributed outcome data—including individual node signals, aggregated community risk, and population-level model tuning—to refine intervention decisions. There is an unmet technical need for methods and systems that can recommend a sequence of node interventions based on prior outcome data and that can continuously monitor, track, and update resource assignment recommendations through deployment cycles. A further technical gap exists for orchestration workflows for specific subpopulations, such as pregnant nodes, or for those that implement node outreach and active status tracking with support for missing or incomplete data and/or operate effectively with sparse datasets.

The present disclosure provides a networked system and method capable of managing and tracking resource allocation and intervention across at-risk end nodes. The disclosure describes technical features to reduce repeat assignments and other complications through implementation of automated and context-aware resource orchestration pipeline stages, with explicit support for dynamic integration of social context data (SDOH). Provision and feedback-driven adjustment of TRO and ERO using these components can reduce operating cost, improve computed outcome scores, and raise system-wide service quality among assigned nodes.

A manual proof-of-concept system tested within the Medi-Cal Healthcare Program in California was designed to evaluate the technical impact of using a centralized transition resource orchestration (TRO) workflow for node management. This trial did not employ automated orchestration, dynamic prioritization, or model-driven adjustment of assignment operations as described in the present disclosure. The results showed a potential benefit of TRO tracking for assigned nodes, but the observed approach was not demonstrated to scale for a higher network volume or to support the requisite level of automation needed in a production orchestration system.

Over a four-month trial, the technical workflow assigned transition resource orchestration (TRO) resources to 399 eligible end nodes. Of these, 328 (82.2%) completed the enrollment protocol; 249 nodes completed at least one in-person event, and 131 nodes completed the entire program, yielding a technical completion rate of 52.6%. Only 7 out of 131 program completers required another remote site resource assignment within 30 days, producing a technical repeat event rate of 5.3%, compared to a baseline of 14.8% for similar nodes in a comparable network environment without centralized orchestration. These outcomes demonstrate that system-side coordination, tracking, and post-assignment monitoring can improve performance relative to legacy models, but a fully automated end-to-end solution is required for general network-wide application.

In some implementations, a resource management system (RMS) can correspond to a health care system (HCS), and in such implementations, the RMS can provide access to resource data and end node information for coordination of services. In some implementations, an orchestration server (OS) can correspond to a central service provider (CSP), and in such implementations, the OS can manage assignment and distribution of resources to end nodes. In some implementations, an end node can correspond to a patient, and in such implementations, the end node can receive resources or services allocated by the orchestration server. In some implementations, end node context data can correspond to patient data, and in such implementations, the end node context data can include operational parameters used for making assignment decisions. In some implementations, end node attributes can correspond to patient characteristics, and in such implementations, the attributes can inform resource selection. In some implementations, a resource pool 201 can correspond to a menu of services, and in such implementations, the resource pool 201 can include various types of services or resources available for allocation.

In some implementations, a network-accessible resource can correspond to a service, and in such implementations, a resource can be allocated to an end node to perform a specific function or task. In some implementations, a network-accessible resource class or network-accessible resource type can correspond to a clinical service or social service, and in such implementations, at least one (e.g., each) resource class can indicate the type of support or capability provided. In some implementations, an orchestration agent can correspond to a care coordinator, and in such implementations, the orchestration agent can adjust resource assignments or sequences based on system logic. In some implementations, an external database can correspond to an electronic medical record (EMR), and in such implementations, the external database can supply supplemental context or historical information. In some implementations, a remote site, data center, or network node can correspond to a hospital or clinic, and in such implementations, the remote site can serve as a location where resources are physically or virtually delivered. In some implementations, end node outcome data can correspond to patient outcomes, and in such implementations, outcome data can be used to determine the effectiveness of resource allocation.

In some implementations, resource orchestration can correspond to care management, and in such implementations, resource orchestration can involve the process of assigning and sequencing resources for end nodes according to a prioritization strategy. In some implementations, extended resource orchestration (ERO) can correspond to extended care management (ECM), and in such implementations, ERO can provide long-term planning and tracking for resource delivery to end nodes. In some implementations, transition resource orchestration (TRO) can correspond to transition care management (TCM), and in such implementations, TRO can include adjustments in resource assignments during state changes or transitions for an end node. In some implementations, feedback monitoring or status polling can correspond to follow-up, and in such implementations, the system 150 can collect data or status reports from end nodes after delivery of resources. In some implementations, a service node or resource node can correspond to a provider, and in such implementations, the service node can deliver specific resources to end nodes or participate in resource allocation. In some implementations, a prioritization model can correspond to an artificial intelligence (AI) model or artificial neural network, and in such implementations, the prioritization model can process context data to generate rankings for assignment.

In some implementations, to orchestrate assignment or schedule a resource can correspond to scheduling care, and in such implementations, the system 150 can arrange the order and timing for resource delivery. In some implementations, resource assignment can correspond to intervention, and in such implementations, the assignment can refer to selecting and providing a particular resource to an end node. In some implementations, a remote site admission or resource allocation event can correspond to a hospital admission or readmission, and in such implementations, the event can indicate when an end node undergoes a significant change requiring allocation of new resources.

In some implementations, operational outcome or event outcome can correspond to a clinical outcome, and in such implementations, the outcome can indicate measurable results following a resource assignment. In some implementations, context parameters can correspond to social determinants of health (SDOH), and in such implementations, context parameters can influence how resources are prioritized for end nodes. In some implementations, manually entered context data can correspond to manually entered data, and in such implementations, the manually entered context data can supplement automatic collection for more accurate assignment. In some implementations, scheduled resource allocation or scheduled event can correspond to an appointment, and in such implementations, a scheduled event can designate a future time for resource assignment. In some implementations, a smart device or endpoint device can correspond to a medical device or smart device, and in such implementations, the device can transmit data or receive resources via the system 150.

In some implementations, resource delivery can correspond to medication delivery, and in such implementations, the delivery can include transmitting or provisioning a resource to an end node. In some implementations, end node registration can correspond to patient enrollment, and in such implementations, registration can provide the end node with eligibility for resource assignments. In some implementations, an external service node can correspond to an external service provider, and in such implementations, the external service node can supply additional resources or services for allocation to end nodes. In some implementations, allocated resources can correspond to prescribed medications, and in such implementations, the allocated resources can include deliverables or services assigned to an end node. In some implementations, automated notification or automated communication can correspond to telephone follow-up, and in such implementations, the notification can deliver information, updates, and/or status requests to end nodes.

In some implementations, an endpoint policy update or context update can correspond to family education, and in such implementations, the update can reflect changes to the configuration or operational parameters of the end node. In some implementations, usage-based or value-based allocation can correspond to value-based reimbursement, and in such implementations, the allocation can depend on demand, usage, and/or operational cost considerations. In some implementations, remote resource provisioning can correspond to hospital at home, and in such implementations, the provisioning can support resource assignments to end nodes at remote or distributed locations. In some implementations, an enterprise or public network environment can correspond to Medicaid or Medicare, and in such implementations, the network environment can define organizational policies and operational rules for system-level resource orchestration.

Figure 8:
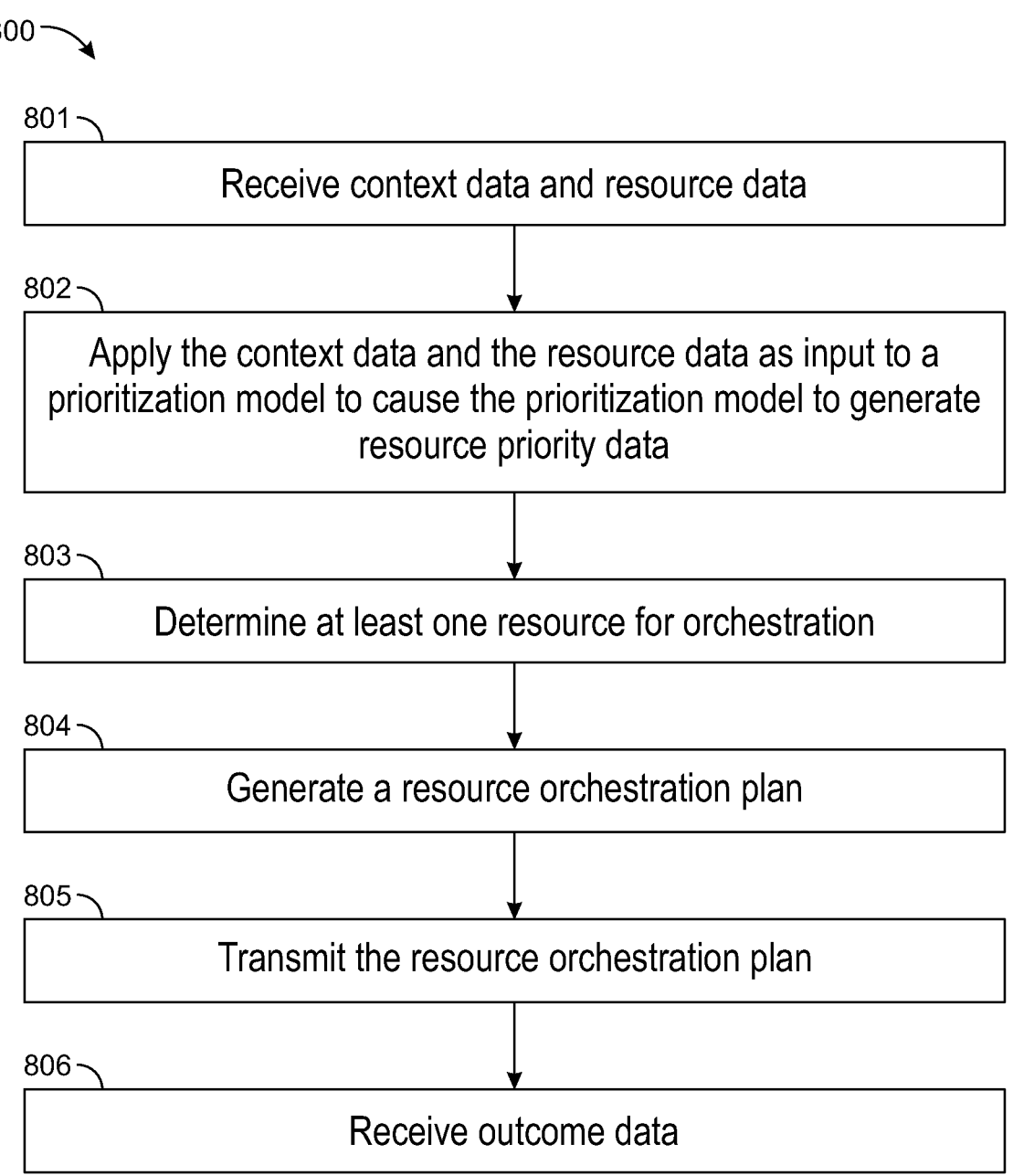
FIG. 8 illustrates the flowchart of contextualized resource orchestration in distributed networks.

With reference to FIG. 8, FIG. 8 shows an example flow diagram illustrating a method for contextualized resource orchestration in distributed networks in an orchestration pipeline, in accordance with some implementations of the present disclosure. This and other arrangements are provided as examples. Alternative arrangements, elements (such as machines, interfaces, functions, orders, or groupings), and configurations can be used in addition to or instead of those shown. Elements described herein can be implemented as discrete or distributed functional entities, alone or in combination, in any configuration or location. Functions can be performed by hardware, firmware, and/or software, for example, using one or more processing circuits executing instructions stored in one or more memory circuits. In some implementations, the system and methods can use one or more language models, one or more computing devices, and/or one or more data centers.

Referring now to FIG. 8, each block of method 800 includes a computing process that can be performed using any combination of hardware, firmware, and/or software. For example, functions can be carried out using one or more processing circuits executing instructions stored in memory. FIG. 8 is a flow diagram showing a method 800 (computer-implemented method) for receiving, applying, generating, determining, and/or transmitting operations (among other operations), in accordance with some implementations of the present disclosure. The method can be embodied as computer-usable instructions stored on computer storage media. The method can be provided as a standalone application, a service or hosted service, a microservice via an application programming interface (API), and/or a plug-in to another product, among other examples. Method 800 is described by way of example with respect to the system of FIG. 1A and FIG. 1B, but can additionally or alternatively be executed by any one system or combination of systems, including those described herein.

The method 800, at block 801, includes receiving, by at least one processor, context data corresponding with an end node and resource data corresponding to a plurality of network-accessible resources. That is, the processing circuits can receive context data associated with an end node and resource data representing information about a plurality of network-accessible resources from any source, device, database, and/or system within the network. For example, the processing circuits can receive sensor readings, operational status, usage history, availability data, scheduling information, and/or any metadata related to one or more end nodes and/or network-accessible resources.

The method 800, at block 802, includes applying, by the at least one processor, the context data and the resource data as input to a prioritization model to cause the prioritization model to generate resource priority data for the end node. That is, the processing circuits can apply the received context data and resource data as input to a prioritization model configured to process and generate resource priority data. For example, the processing circuits can feed feature vectors, data matrices, arrays, or records representing end node context and resource characteristics into a neural network, machine learning model, ranking engine, and/or any prioritization module to generate scores, rankings, and/or selection indicators for at least one (e.g., each) network-accessible resource.

The method 800, at block 803, includes determining, by the at least one processor, at least one network-accessible resource from the plurality of network-accessible resources for orchestration at the end node based on the resource priority data. That is, the processing circuits can determine at least one network-accessible resource for allocation, assignment, and/or orchestration at the end node based on the output resource priority data from the prioritization model. For example, the processing circuits can select top-ranked resources, match available resources to the context of the end node, filter resources meeting a threshold priority, and/or identify a set of candidate resources for subsequent planning.

The method 800, at block 804, includes generating, by the at least one processor, a resource orchestration plan identifying at least one assignment and sequence of the at least one network-accessible resource for the end node. That is, the processing circuits can generate a resource orchestration plan describing the assignment and sequence of the determined network-accessible resource(s) for the end node. For example, the processing circuits can build a plan object, schedule, workflow map, list of timed assignments, array of resource-task pairs, and/or a sequence of actions to deliver the selected network-accessible resources to the end node.

The method 800, at block 805, includes transmitting, by the at least one processor, the resource orchestration plan to an orchestration server for execution. That is, the processing circuits can transmit the generated resource orchestration plan to an orchestration server, another system, or a downstream module for execution. For example, the processing circuits can send the plan as a protocol message, instruction set, data packet, API call, and/or formatted command to a server responsible for coordinating resource execution or delivery.

The method 800, at block 806, includes receiving, by the at least one processor, outcome data corresponding to execution of the resource orchestration plan at the end node. That is, the processing circuits can receive outcome data corresponding to execution of the resource orchestration plan from the end node, orchestration server, service node, resource, and/or any reporting device. For example, the processing circuits can acquire confirmation messages, completion status reports, result logs, measurement data, error notifications, or feedback data after execution of assigned resources, and/or store or process this outcome data for further analysis or model updating.

In some implementations, the prioritization model can include at least one of a neural network, a machine learning model, a rules-based model, and/or a statistical model. In some implementations, the processing circuits can update the prioritization model based on at least a portion of the outcome data. In some implementations, the context data can include at least one of a location identifier, a time interval, a usage statistic, and/or an operational status of the end node. In some implementations, the processing circuits can tag at least one of the plurality of network-accessible resources with availability metadata including the location identifier and the time interval. In some implementations, the resource data can include a subset of the plurality of network-accessible resources based on the availability metadata.

In some implementations, the processing circuits can receive resource availability data including a geographical availability and a time availability of at least one of the plurality of network-accessible resources. In some implementations, the processing circuits can determine, based on at least one of the location identifier, the time interval, the usage statistic, or the operational status of the end node and the resource availability data, at least one available network-accessible resource of the plurality of network-accessible resources for the end node. In some implementations, the processing circuits can update the resource data based on the at least one available network-accessible resource.

In some implementations, the location identifier and the time interval can include current location data for the end node at a first time, the current location data received in real-time from a user device corresponding with the end node. In some implementations, the resource orchestration plan can include two or more network-accessible resources for provision to the end node based on at least one dependency and/or criteria. In some implementations, the context data can further include at least one clinical characteristic and at least one social characteristic of the end node, and at least one of the plurality of network-accessible resources can correspond to a categorization as a clinical resource and/or a social resource.

In some implementations, the processing circuits can, based on the categorization of the at least one network-accessible resource, cause at least one of a presentation of a notification on a user device of the end node corresponding to the clinical resource and/or the social resource, an initiation of execution of the clinical resource and/or the social resource to the end node, or an allocation of the clinical resource and/or the social resource to the end node. In some implementations, the processing circuits can update the outcome data corresponding to the end node based on at least one of a presentation of the notification, an initiation of execution, and/or an allocation. In some implementations, the processing circuits can receive, from at least one external service node, external service node data including at least one of the plurality of network-accessible resources. In some implementations, the processing circuits can update the resource priority data based on the external service node data.

In some implementations, the processing circuits can transmit, to the at least one external service node, a resource allocation request message including at least one of the plurality of network-accessible resources. In some implementations, the processing circuits can receive, from the at least one external service node, at least one resource provisioning response message including a bid parameter, the bid parameter including at least one of an availability, a cost, a capability, or an assignment for a corresponding network-accessible resource. In some implementations, the processing circuits can determine an inclusion of the corresponding network-accessible resource in the resource orchestration plan based at least on the at least one resource provisioning response message.

The foregoing disclosure can be implemented using machine-readable instructions, including instructions executable by processing circuitry of one or more devices. Program modules can include routines, processes, subprograms, data structures, and/or other code configured to perform operations, control components, and/or process information. The disclosure can be implemented in a variety of computing environments, including but not limited to, servers, workstations, general-purpose computers, embedded devices, mobile computing devices, networked computing devices, client systems, gateway devices, routers, and/or combinations thereof. The implementation can use hardware, firmware, software, and/or any combination of these. Hardware implementations can include logic circuits, application-specific integrated circuits (ASICs), field-programmable gate arrays (FPGAs), and/or other processing structures. Software and/or firmware implementations can include executable instructions stored on one or more memory devices.

System configurations can include single device architectures or distributed architectures in which multiple devices communicate through one or more networks. A network can include any interconnection of nodes using wired and/or wireless connections, such as local area networks, wide area networks, cellular networks, cloud-based environments, and/or combinations thereof. Distributed implementations can support processing and data storage at remote locations, with network interfaces managing communication among devices and/or components of a system. Components of the disclosure can be virtualized and/or implemented as part of cloud services, microservices, containers, and/or hosted software.

Instructions can be stored by one or more tangible storage media, which can include memory circuits, hard drives, optical storage, flash memory, and/or any suitable non-transitory computer-readable medium. Instructions can be stored by one or more non-transitory memory circuits, such as random access memory, read-only memory, optical storage, magnetic storage, solid-state drives, and/or other memory devices. Data and instructions can be transferred between system components using communication buses, direct memory access, and/or communication protocols.

The present disclosure describes examples selected for clarity of function and statutory support. These examples are not intended to limit the claimed subject matter. Subject matter described herein can be implemented in other forms, which can include alternative steps, step sequences, components, system architectures, and/or technologies available now or in the future. Unless expressly specified, the recitation of the terms "block" or "step" to describe portions of a method or process does not indicate a required order and/or a required limitation, except where an explicit order is described.

Feature combinations disclosed herein are not intended to limit the scope of the disclosure. Features described in separate claims or examples can be combined in any arrangement, regardless of whether at least one (e.g., each) combination is explicitly recited. At least one (e.g., each) dependent claim can be combined with any other claim in the claim set. As used herein, "at least one of" a list of items indicates any subset, permutation, and/or combination of those items, including individual items and repetitions. For example, "at least one of: a, b, or c" covers a, b, c, a and b, a and c, b and c, or a, b, and c.

The phrase "a processor" or "one or more processors," or similar terms for devices or components, is intended to encompass any implementation in which one or more processors are configured to perform specified operations. This includes a single processor performing all operations, multiple processors performing subsets of operations, or any distribution of operations across multiple processors. Unless explicitly required (for example, by "first processor" and "second processor"), no claim should be interpreted to require any particular processor-to-operation mapping.

No element, act, or instruction should be construed as critical or essential unless explicitly specified as such. As used herein, singular forms (e.g., "a," "an," or "the") are intended to include plural referents unless the context clearly indicates otherwise. The terms "comprise," "include," or "have," and variations thereof, are intended to cover non-exclusive inclusions. The phrase "based on" means "based at least in part on" unless specified otherwise. The term "and"

and "or" when used in a list, is inclusive and may be used interchangeably with "and/or" except where exclusive language is explicitly used.

Throughout the disclosure, features described with respect to one aspect or example can be combined with features of other aspects and/or examples unless explicitly stated otherwise. Implementations described herein can be combined in any suitable manner under the scope of the present disclosure.

What is claimed is:

1. A computer-implemented method, comprises:

receiving, by at least one processor, context data corresponding with an end node and resource data corresponding to a plurality of network-accessible resources;

tagging, by the at least one processor writing to a metadata field, at least one of the plurality of network-accessible resources with availability metadata comprising a location identifier and a time interval, wherein the resource data comprises a subset of the plurality of network-accessible resources based on the availability metadata, and wherein the location identifier and the time interval comprise current location data for the end node at a first time, the current location data received from a user device corresponding with the end node;

applying, by the at least one processor, the context data and the resource data as input to a prioritization model to cause the prioritization model to generate resource priority data for the end node;

determining, by the at least one processor, at least one network-accessible resource from the plurality of network-accessible resources for orchestration at the end node based on the resource priority data, wherein determining comprises selecting, from the plurality of network-accessible resources, at least one resource comprising a priority value in the resource priority data satisfying a threshold and designating the at least one resource for assignment;

generating, by the at least one processor, a resource orchestration plan identifying at least one assignment and sequence of the at least one network-accessible resource for the end node;

transmitting, by the at least one processor, the resource orchestration plan to the end node for execution; and receiving, by the at least one processor, outcome data corresponding to execution of the resource orchestration plan at the end node.

2. The computer-implemented method of claim 1, wherein the prioritization model comprises at least one of a neural network, a machine learning model, a rules-based model, or a statistical model.

3. The computer-implemented method of claim 1, further comprising:

updating, by the at least one processor, the prioritization model based on at least a portion of the outcome data.

4. The computer-implemented method of claim 1, wherein the context data comprises at least one of location identifier, time interval, usage statistic, resource availability, or operational status of the end node.

5. The computer-implemented method of claim 4, further comprises:

receiving, by the at least one processor, resource availability data corresponding to a geographical availability and a time availability of at least one of the plurality of network-accessible resources;

determining, by the at least one processor based on at least one of the location identifier, the time interval, the usage statistic, or the operational status of the end node, and the resource availability data, at least one available network-accessible resource of the plurality of network-accessible resources for the end node; and updating, by the at least one processor, the resource data based on the at least one available network-accessible resource.

6. The computer-implemented method of claim 1, wherein the resource orchestration plan comprises two or more network-accessible resources for provision to the end node based on at least one dependency or criteria.

7. The computer-implemented method of claim 1, wherein the context data further comprises at least one clinical characteristic and at least one social characteristic of the end node, and at least one of the plurality of network-accessible resources correspond to a categorization as a clinical resource or a social resource.

8. The computer-implemented method of claim 7, further comprising:

causing, by the at least one processor based on the categorization of the at least one network-accessible resource, at least one of:

a presentation of a notification on a user device of the end node corresponding to the clinical resource or the social resource;

an initiation of execution of the clinical resource or the social resource to the end node; or an allocation of the clinical resource or the social resource to the end node; and updating, by the at least one processor, the outcome data corresponding to the end node based on at least one of (i) the presentation of the notification, (ii) the initiation of execution, or (iii) the allocation.

9. The computer-implemented method of claim 1, further comprising:

receiving, by the at least one processor from at least one external service node, external service node data corresponding to at least one of the plurality of network-accessible resources; and updating, by the at least one processor, the resource priority data based on the external service node data.

10. The computer-implemented method of claim 9, further comprising:

transmitting, by the at least one processor to the at least one external service node, a resource allocation request message corresponding to at least one of the plurality of network-accessible resources;

receiving, by the at least one processor from the at least one external service node, at least one resource provisioning response message comprising a bid parameter, the bid parameter corresponding to at least one of an availability, a cost, a capability, or an assignment for a corresponding network-accessible resource; and determining, by the at least one processor, an inclusion of the corresponding network-accessible resource in the resource orchestration plan based at least on the at least one resource provisioning response message.

11. A system, comprises:

one or more processors to:

receive context data corresponding with an end node and resource data corresponding to a plurality of network-accessible resources;

tag, writing to a metadata field, at least one of the plurality of network-accessible resources with availability metadata comprising a location identifier and a time interval, wherein the resource data comprises a subset of the plurality of network-accessible resources based on the availability metadata, and wherein the location identifier and the time interval comprise current location data for the end node at a first time, the current location data received from a user device corresponding with the end node;

apply the context data and the resource data as input to a prioritization model to cause the prioritization model to generate resource priority data for the end node;

determine at least one network-accessible resource from the plurality of network-accessible resources for orchestration at the end node based on the resource priority data, wherein determining comprises selecting, from the plurality of network-accessible resources, at least one resource comprising a priority value in the resource priority data satisfying a threshold and designating the at least one resource for assignment;

generate a resource orchestration plan identifying at least one assignment and sequence of the at least one network-accessible resource for the end node;

transmit the resource orchestration plan to the end node for execution; and receive outcome data corresponding to execution of the resource orchestration plan at the end node.

12. The system of claim 11, wherein the prioritization model comprises at least one of a neural network, a machine learning model, a rules-based model, or a statistical model.

13. The system of claim 11, wherein the one or more processors are to:

update the prioritization model based on at least a portion of the outcome data.

14. The system of claim 11, wherein the context data comprises at least one of location identifier, time interval, resource availability, usage statistic, or operational status of the end node.

15. The system of claim 14, wherein the one or more processors are to:

receive resource availability data corresponding to a geographical availability and a time availability of at least one of the plurality of network-accessible resources;

determine, based on at least one of the location identifier, the time interval, the usage statistic, or the operational status of the end node, and the resource availability data, at least one available network-accessible resource of the plurality of network-accessible resources for the end node; and update the resource data based on the at least one available network-accessible resource.

16. A non-transitory computer-readable medium storing instructions that, when executed by at least one processor, cause the at least one processor to perform operations comprising:

receive context data corresponding with an end node and resource data corresponding to a plurality of network-accessible resources;

tag, writing to a metadata field, at least one of the plurality of network-accessible resources with availability metadata comprising a location identifier and a time interval, wherein the resource data comprises a subset of the plurality of network-accessible resources based on the availability metadata, and wherein the location identifier and the time interval comprise current location data for the end node at a first time, the current location data received from a user device corresponding with the end node;

apply the context data and the resource data as input to a prioritization model to cause the prioritization model to generate resource priority data for the end node;

determine at least one network-accessible resource from the plurality of network-accessible resources for orchestration at the end node based on the resource priority data, wherein determining comprises selecting, from the plurality of network-accessible resources, at least one resource comprising a priority value in the resource priority data satisfying a threshold and designating the at least one resource for assignment;

generate a resource orchestration plan identifying at least one assignment and sequence of the at least one network-accessible resource for the end node;

transmit the resource orchestration plan to the end node for execution; and receive outcome data corresponding to execution of the resource orchestration plan at the end node.

* * * * *